United States Patent
Qiu et al.

(10) Patent No.: US 12,355,722 B2
(45) Date of Patent: *Jul. 8, 2025

(54) VALIDATION OF ALIGNMENT OF WIRELESS AND WIRELINE NETWORK FUNCTION CONFIGURATION WITH DOMAIN NAME SYSTEM RECORDS

(71) Applicant: AT&T Intellectual Property I, L.P., Atlanta, GA (US)

(72) Inventors: Chaoxin Qiu, Austin, TX (US); Eric Ashby, Batavia, IL (US); Min Lu, Holmdel, NJ (US); Lakshminarashimhan Naidu, Pearland, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,861

(22) Filed: Jun. 25, 2024

(65) Prior Publication Data

US 2024/0356888 A1    Oct. 24, 2024

Related U.S. Application Data

(63) Continuation of application No. 18/056,501, filed on Nov. 17, 2022, now Pat. No. 12,058,098.

(51) Int. Cl.
*H04L 61/5014* (2022.01)
*H04L 61/4511* (2022.01)
(Continued)

(52) U.S. Cl.
CPC ...... *H04L 61/4511* (2022.05); *H04L 61/4535* (2022.05); *H04L 61/50* (2022.05); *H04L 61/5007* (2022.05); *H04L 61/5014* (2022.05)

(58) Field of Classification Search
CPC . H04L 61/4511; H04L 61/4535; H04L 61/50; H04L 61/5007; H04L 61/5014; H04L 61/5061
(Continued)

(56) References Cited

U.S. PATENT DOCUMENTS

| 8,812,727 B1 | 8/2014 | Sorenson et al. |
| 8,996,837 B1 | 3/2015 | Bono et al. |

(Continued)

FOREIGN PATENT DOCUMENTS

| CA | 2714973 A1 | 8/2009 | |
| CA | 3028273 C * | 9/2019 | ............. G06F 15/16 |
| CN | 109150561 A * | 1/2019 | ......... H04L 41/0631 |

OTHER PUBLICATIONS

Naidu, et al., "System and Method for Managing Domain Name System Records", U.S. Appl. No. 17/958,918, filed Oct. 3, 2022, 42 pages.

*Primary Examiner* — Khanh Q Dinh
(74) *Attorney, Agent, or Firm* — Guntin & Gust, PLC; Mark Wilinski

(57) ABSTRACT

Techniques for validating alignment between network element configuration and DNS records associated with a communication network are presented. Alignment management component (AMC) can retrieve respective configuration parameter data items relating to respective configuration parameters associated with respective resource-related identifiers, and respective metadata items associated with the respective resource-related identifiers, from a configuration data store; and retrieve respective DNS records from respective DNS name servers, based on analyzing the respective metadata items associated with respective DNS records. For each resource-related identifier that is supposed to have a corresponding DNS record, based on the result of analyzing the respective configuration parameter data items and (Continued)

respective DNS records, AMC can determine whether the resource-related identifier has a corresponding DNS record stored in the DNS name server indicated by the metadata item. AMC can generate an audit report comprising a missing DNS record data item for each DNS record determined to be missing.

20 Claims, 13 Drawing Sheets

(51) Int. Cl.
*H04L 61/4535* (2022.01)
*H04L 61/50* (2022.01)
*H04L 61/5007* (2022.01)

(58) Field of Classification Search
USPC .......................................... 709/220, 224–228
See application file for complete search history.

(56) References Cited

U.S. PATENT DOCUMENTS

| | | | |
|---|---|---|---|
| 9,009,178 B2 * | 4/2015 | Probasco | H04W 4/029 |
| | | | 707/758 |
| 9,055,076 B1 | 6/2015 | Sorenson et al. | |
| 9,304,999 B1 | 4/2016 | Bono et al. | |
| 9,305,071 B1 | 4/2016 | Bono et al. | |
| 9,424,117 B1 | 8/2016 | Bono et al. | |
| 9,805,105 B1 | 10/2017 | Bono et al. | |
| 10,447,524 B1 | 10/2019 | Bono et al. | |
| 10,459,905 B2 | 10/2019 | Floyd et al. | |
| 11,488,589 B1 * | 11/2022 | Fregly | G10L 15/22 |
| 2013/0212215 A1 * | 8/2013 | Ukkola | H04L 67/02 |
| | | | 709/217 |
| 2014/0289377 A1 * | 9/2014 | Dutko | H04L 41/0803 |
| | | | 709/220 |
| 2014/0359698 A1 | 12/2014 | Sorenson et al. | |
| 2015/0067112 A1 * | 3/2015 | Gokhale | H04L 41/0809 |
| | | | 709/220 |
| 2015/0189061 A1 | 7/2015 | Ryu et al. | |
| 2016/0191415 A1 | 6/2016 | Reddy et al. | |
| 2017/0201598 A1 | 7/2017 | Floyd et al. | |
| 2019/0280948 A1 * | 9/2019 | Abley | H04L 12/46 |
| 2019/0281009 A1 * | 9/2019 | Abley | H04L 63/1458 |
| 2020/0137024 A1 * | 4/2020 | Janakiraman | H04L 63/0236 |
| 2020/0137093 A1 | 4/2020 | Janakiraman et al. | |
| 2020/0137094 A1 | 4/2020 | Janakiraman | |
| 2020/0137115 A1 * | 4/2020 | Janakiraman | H04L 43/028 |
| 2020/0167093 A1 * | 5/2020 | Lan | G06F 3/0664 |
| 2020/0167094 A1 * | 5/2020 | Sariel | G06F 3/067 |
| 2024/0171539 A1 | 5/2024 | Qui et al. | |

* cited by examiner

```
dig @localhost scsf-att1.walil02isc.site1.examplezone.subdomain.domain.net AAAA
<<>> DiG 9.8.2rc1-RedHat-9.8.2-0.68.rc1.el6_10.1 <<>> @localhost scsf-
att1.walil02isc.site1.examplezone.subdomain.domain.net AAAA
...

;; QUESTION SECTION:
;scsf-att1.walil02isc.site1.examplezone.subdomain.domain.net.   IN  AAAA
;; ANSWER SECTION:
scsf-att1.walil02isc.site1.examplezone.subdomain.domain.net. 3600 IN AAAA 2001:1890:1001:220b::16
scsf-att1.walil02isc.site1.examplezone.subdomain.domain.net. 3600 IN AAAA 2001:1890:1001:220b::18
scsf-att1.walil02isc.site1.examplezone.subdomain.domain.net. 3600 IN AAAA 2001:1890:1001:220b::17
...

;; QUESTION SECTION:
;_sip._udp.scsf-att2.walil02isc.site1.examplezone.subdomain.domain.net.  IN  SRV
;; ANSWER SECTION:
_sip._udp.scsf-att2.walil02isc.site1.examplezone.subdomain.domain.net. 3600 IN SRV 20 97 5063 scsf-att2.imux-
0003.walil02isc.site1.examplezone.subdomain.domain.net.
--
```

```
[1j2982@walil01ubs02udb ~]$ dig @localhost  walil01bgcnet2.site1.examplezone.subdomain.domain.net AAAA
...
;; QUESTION SECTION:
;walil01bgcnet2.site1.examplezone.subdomain.domain.net. IN AAAA
;; ANSWER SECTION:
walil01bgcnet2.site1.examplezone.subdomain.domain.net. 3600 IN AAAA 2001:1890:1001:2207::4      ← 402
;; Query time:
...
;; QUESTION SECTION:
;_sip._udp.ussdiwf.national.examplezone.subdomain.domain.net. IN SRV
;; ANSWER SECTION:
_sip._udp.ussdiwf.national.examplezone.subdomain.domain.net. 3600 IN SRV 2 1 51000 wbil01cviwf.site2.examplezone.subdomain.domain.net.     ← 404
_sip._udp.ussdiwf.national.examplezone.subdomain.domain.net. 3600 IN SRV 1 1 51000 walil01cviwf.site1.examplezone.subdomain.domain.net.   ← 406
_sip._udp.ussdiwf.national.examplezone.subdomain.domain.net. 3600 IN SRV 1 1 51000 wcil01cviwf.site2.examplezone.subdomain.domain.net.    ← 408

;; Query time: 1 msec
;; SERVER: ...
```

FIG. 4

VALIDATION OF ALIGNMENT OF WIRELESS AND WIRELINE NETWORK FUNCTION CONFIGURATION WITH DOMAIN NAME SYSTEM RECORDS

CROSS-REFERENCE TO RELATED APPLICATION(S)

This application is a continuation of U.S. patent application Ser. No. 18/056,501, filed Nov. 17, 2022. All sections of the aforementioned application(s) are incorporated herein by reference in their entirety.

TECHNICAL FIELD

The subject disclosure relates generally to communication networks, e.g., to validation of alignment of wireless and wireline network function configuration with domain name system records.

BACKGROUND

A communication network, such as a fourth generation (4G), a fifth generation (5G), or other wireless communication network, and/or a wireline communication network, can employ various network functions that perform respective network operations, and can interact or communicate with other network functions, nodes, elements, or components of the communication network. Respective network functions can be associated with respective domain name system (DNS) records, which can provide information or instructions relating to respective domains, including respective Internet protocol (IP) addresses associated with the respective domains, and how to process or handle respective requests for the respective domains. DNS records typically can be stored in DNS name servers, and can be accessed from the DNS name servers to facilitate processing and handling the requests.

The above-described description is merely intended to provide a contextual overview relating to communication networks, and is not intended to be exhaustive.

BRIEF DESCRIPTION OF THE DRAWINGS

FIG. 3 depicts a diagram of a non-limiting example of DNS records that can correspond to resource-related identifiers in the configuration parameter for the S-CSCF, in accordance with various aspects and embodiments of the disclosed subject matter.

FIG. 4 depicts yet another diagram of a non-limiting example of DNS records that can correspond to resource-related identifiers in the configuration parameter for the S-CSCF, in accordance with various aspects and embodiments of the disclosed subject matter.

DETAILED DESCRIPTION

Figure 1:
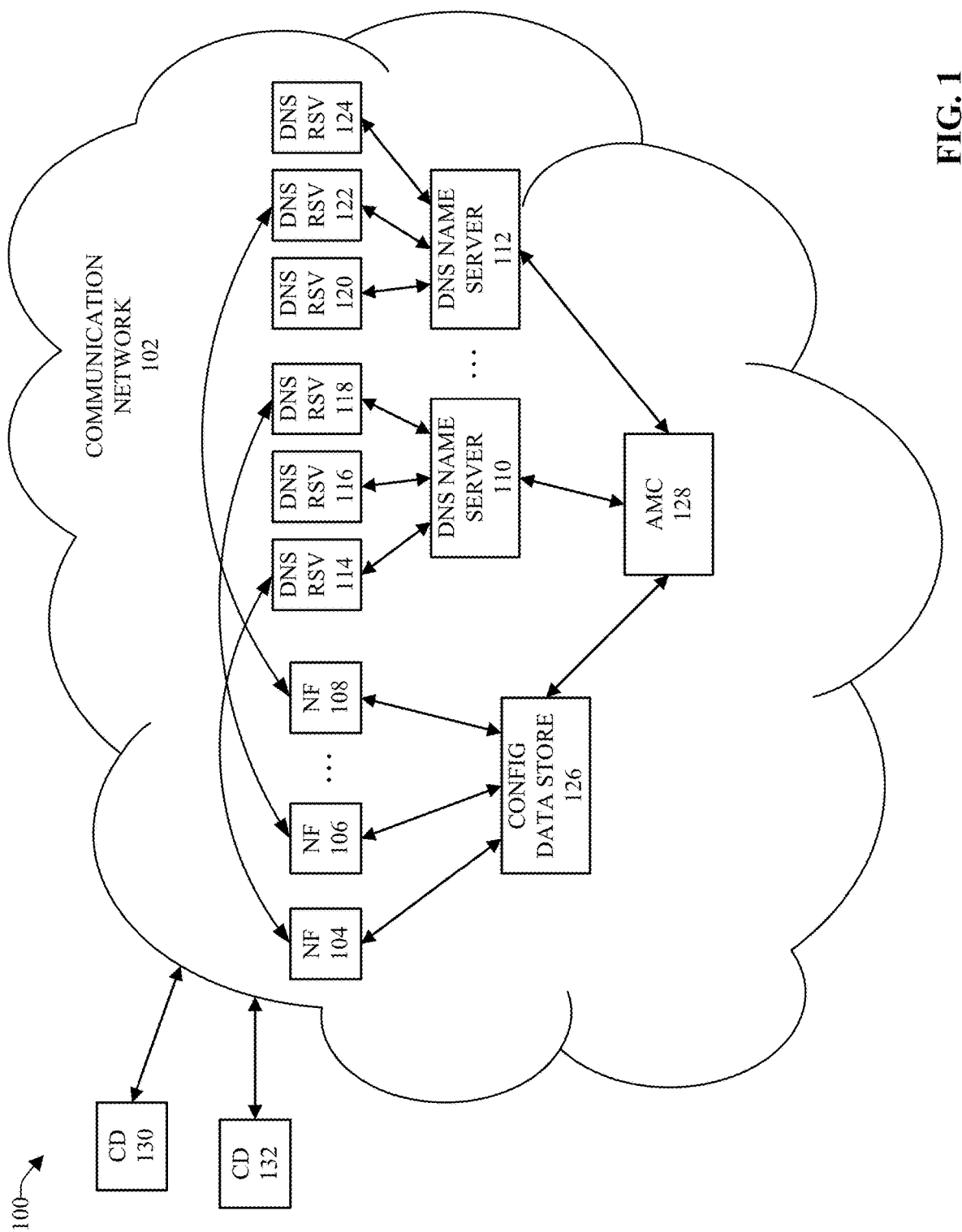
FIG. 1 depicts a block diagram of an example, non-limiting system that can desirably validate alignment, and/or report misalignment, between wireless and wireline network element configuration and DNS records associated with a communication network, in accordance with various aspects and embodiments of the disclosed subject matter.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

In a large communication network, hundreds of instances of various network functions (NFs) can be deployed in various data centers to support a variety of communication services (e.g., voice calls, video calls, conference calls, 911 calls, real-time-text (RTT), Internet protocol (IP) messaging, or other communication services). To maintain quality of services, load balance, efficiency of end-to-end signaling and media communication paths of the communication network, it can be desirable (e.g., wanted or required) that each NF instance be configured to contact next-hop NF instances with locality proximity, load distribution, and geographical failover capability. As such, each NF instance can use internal configuration parameters to teach the call process where to find next hop to continue a call set up and message forwarding.

When various fully qualified domain names (FQDNs) or uniform resource identifiers (URIs) are used in configuration parameters in an NF instance, the NF can (e.g., may or will have to) contact a domain-name-system (DNS) server to resolve the FQDNs and/or URIs into specific IP addresses to be able to fulfill the intended communication. In some cases, the DNS resolution can be conducted iteratively: name authority pointer (NAPTR), then service records (SRV), and then address (A) and/or AAAA records. In a large communication network, it is common that these FQDNs/URIs are located in various domains, as such, the records may be located in various authoritative DNS name servers, in accordance with a desired DNS name server hierarchy organization.

It can be desirable (e.g., wanted or required) for every configuration parameter with FQDN or URI to be resolvable in DNS for the NF to obtain IP addresses intended to the FQDN or URI. This can be desirable (e.g., useful or critical) for the communication network to function properly. However, with large numbers of such FQDNs and URIs in the NF configuration gold standard, it can be difficult to check and ensure every one of them has proper corresponding DNS records.

Existing approaches can involve network operators relying on manual procedures, which can include change control processes, and regression testing to accomplish or maintain alignment between network element configuration and DNS records in a communication network. Discrepancies between the network element configuration and DNS records often can be discovered and fixed during the operation readiness testing phase. Some users (e.g., network operators or other network personnel) may use test scripts to exercise as many combinations of possible message communication paths as possible. Some users may use a "DNS view" feature to attempt to simplify the network element configuration, but can move more data management complexity into the DNS system. DNS views can provide the ability to serve one version of DNS data to one set of clients and another version to another set of clients. It can allow a single high level FQDN or URI for a configuration parameter in all instances of a same NF type. The DNS system can be configured to return different resolution records based on which NF instance queries the DNS. This approach can simplify the NF configuration, but can make data management in the DNS system significantly more difficult.

However, while manual procedures can be utilized by users to accomplish or maintain alignment between network element configuration and DNS records, for communication networks (e.g., larger communication networks), particularly as network operators advance to cloud-based infrastructure and strive for a real-time on-demand operation model, manual procedures for alignment between network element configuration and DNS records can be undesirably (e.g., unacceptably or inefficiently) error-prone and regression testing can be undesirably time consuming and costly to satisfy (e.g., meet) the business needs of the owners, managers, or operators of the communication network. Further, the use of some features, such as DNS view, by users can undesirably increase data management complexity in the DNS system and can make data management in the DNS system more difficult.

The disclosed subject matter can overcome these and other problems associated with alignment between network element configuration and DNS records associated with a communication network.

To that end, techniques, methods, and systems for aligning (e.g., automatically aligning) wireless and wireline network element (e.g., NF) configuration with DNS records are presented. The disclosed subject matter can comprise an alignment management component (AMC) that can desirably (e.g., automatically, efficiently, accurately, suitably, enhancedly, or optimally) validate alignment, and/or report misalignment, between wireless and wireline network element configuration and DNS records. The AMC can manage and/or perform various operations and processing relating to aligning wireless and wireline network element configuration with DNS records.

In some embodiments, the AMC can retrieve (e.g., extract, access, obtain, or receive) respective configuration parameter data items relating to the respective configuration parameters associated with respective resource-related identifiers (e.g., FQDN, URI, or other type of resource-related identifier), and respective metadata items associated with the respective resource-related identifiers, from a configuration data store (e.g., a data store comprising a network element configuration gold standard (GS) database). The configuration parameter data items can comprise information relating to the configuration parameters and/or associated resource-related identifiers. A metadata item can indicate whether a resource-related identifier is associated with (e.g., requires) a corresponding DNS record, can indicate a type of DNS record that can be associated with the resource-related identifier, or can indicate a DNS name server where the DNS record is specified, expected, or supposed to be stored. The respective metadata items can be associated with (e.g., can correspond to) respective DNS records.

The AMC can analyze the respective metadata items. Based at least in part on the result of analyzing the respective metadata items, the AMC can retrieve respective DNS records, which can comprise respective DNS record data items, from respective DNS name servers. The AMC can analyze the respective configuration parameter data items and the respective DNS record data items of the respective DNS records. With regard to each resource-related identifier for which a DNS record is supposed (e.g., required) to be associated, based at least in part on the result of analyzing the respective configuration parameter data items and the respective DNS record data items, the AMC can determine whether the resource-related identifier has a corresponding DNS record stored in the DNS name server indicated by the associated metadata item.

With regard to each resource-related identifier for which a DNS record is supposed (e.g., required) to be associated, if the AMC determines that the corresponding DNS record is not detected as being stored in the respective DNS name servers (e.g., is not detected as being stored in the DNS name server indicated by the corresponding metadata item), the AMC can generate a missing DNS record data item that can indicate the corresponding DNS record is determined not to be stored in the respective DNS name servers. The AMC can generate an audit report comprising one or more missing respective DNS record data items with regard to one or more respective DNS records that the AMC has determined to be missing from the respective DNS name servers. The AMC can communicate the audit report, or a desired portion thereof, to one or more users (e.g., one or more network operators or other users) who can be responsible (e.g., who are indicated or determined to be responsible) for resolving the issue of the one or more missing DNS records, such as described herein.

In some embodiments, if the AMC determines that a DNS record associated with a metadata item is stored in a DNS name server, the AMC can generate a verified DNS record data item that can indicate that the DNS record is determined to be stored in the DNS name server. In certain embodiments, the AMC can include such verified DNS record data item in the audit report. In other embodiments, if the AMC determines that a DNS record associated with a metadata item is stored in a DNS name server, the AMC can omit (e.g., bypass) generation of a verified DNS record data item and/or can omit inclusion of the verified DNS record data item in the audit report (e.g., the AMC can include missing respective DNS record data items in the audit report, while omitting verified DNS record data items from the audit report).

The disclosed subject matter, employing the AMC, can desirably (e.g., automatically, accurately, efficiently, enhancedly, and/or optimally) validate alignment between, and/or report misalignment, wireless and wireline network element (e.g., NF) configuration and DNS records, streamline a large communication network system deployment with an enhanced (e.g., intelligent) automation audit process, reduce errors associated with aligning network element configuration and DNS records, increase the speed of aligning network element configuration and DNS records, and reduce costs (e.g., resource costs, financial costs, time costs) associated with aligning network element configuration and DNS records. The disclosed subject matter, employing the AMC, also can desirably and significantly speed up new service deployment (e.g., time-to-market) and maintain integrity of the communication network integration, which can save network operation cost and improve the network service quality.

These and other aspects and embodiments of the disclosed subject matter will now be described with respect to the drawings.

FIG. 1 depicts a block diagram of an example, non-limiting system 100 that can desirably (e.g., automatically, accurately, efficiently, and/or optimally) validate alignment, and/or report misalignment, between wireless and wireline network element (e.g., NF) configuration and DNS records associated with a communication network, in accordance with various aspects and embodiments of the disclosed subject matter. The system 100 can comprise a communication network 102, which can be or can comprise a wireless or cellular communication network, a wireline communication network, or other type of communication network. In some embodiments, the communication network 102 can be or can comprise a packet-based network that can communicate data (e.g., packets of data) using a desired communication protocol (e.g., mobility protocols, Internet protocol (IP), IP version 4 (IPv4), mobile IPV4, IP version 6 (IPv6), mobile IPV6, transmission control protocol (TCP), user datagram protocol (UDP), or other desired communication protocol).

The communication network 102 can comprise various network elements, including NFs, such as NF 104, NF 106, and NF 108, and other network elements (e.g., network components, devices, or equipment) that can operate to enable communication of information between communication devices (not shown) associated with (e.g., communicatively connected to) the communication network 102. In accordance with various embodiments, a NF (e.g., 104, 106, or 108) can be a physical network function (PNF), a virtualized network function (VNF), or a cloud-native or containerized network function (CNF) (e.g., a containerized virtual network function). PNFs can include, for example, physical routers, switches, terminal servers, and/or other types of physical network functions or components. In certain embodiments, the NFs (e.g., 104, 106, or 108) can comprise network functions associated with a core network (e.g., mobility or wireless core network), such as, for example, serving call session control function (S-CSCF or serving CSCF), breakout gateway control function (BGCF), service centralization and continuity application server (SCC-AS), emergency access transfer function (EATF), converged IP messaging server (CPM), interworking function (IWF), a short message service function (SMSF), user plane function (UPF), core access and mobility management function (AMF), authentication server function (AUSF), session management function (SMF), network slice selection function (NSSF), network exposure function (NEF), network function repository function (NRF), policy control function (PCF), unified data management (UDM), application function (AF), data network (DN), or other desired type of function.

The communication network 102 also can comprise or be associated with a desired number of DNS name servers, which can include DNS name server 110 and DNS name server 112. The respective DNS name servers (e.g., DNS name server 110, DNS name server 112, and/or other DNS name server) can store DNS records or other desired information that can facilitate communication and routing of information in the communication network 102, such as described herein. Respective DNS records can comprise or store respective information and/or instructions that can be map or facilitate mapping respective URLs to respective IP addresses. There can be various types of DNS records (e.g., resource records), including, for example, service (SRV) records, name authority pointer (NAPTR) records, address (A) records associated with IPv4 addresses, AAAA records associated with IPV6 addresses, and/or other desired types of DNS and/or resource records.

SRV records can be utilized to identify devices (e.g., computers, servers, or other types of communication devices) hosting particular services, such as Voice over IP (VOIP), instant or text messaging, or other types of services (e.g., communication services or other services), and can facilitate establishing connections between a service and a hostname. In some embodiments, an SRV record can comprise a symbolic name of a service and a transport protocol associated with the service and which can be used as part of the domain name.

A NAPTR record can comprise or specify a rule or instruction that can utilize a substitute expression to rewrite an information string into a domain name or URI, wherein a URI can be an uniform resource locator (URL) or uniform resource name (URN) that can identify a resource associated with the communication network 102 (e.g., the Internet of or associated with the communication network 102). NAPTR records can map the Internet telephony address space to the Internet address space. In some embodiments, NAPTR records can be utilized with SRV records to facilitate identifying or discovering types of services that can be available for a resource name.

An A record can map a domain name to an IPV4 address of a device (e.g., computer, server, or other communication device) that can be hosting the domain. The A record can be utilized to facilitate identifying, finding, or locating the IPV4 address of a device connected to the communication network 102 (e.g., the Internet of or associated with the communication network 102) based on a name. An AAAA record can map a domain name to an IPV6 address of a device that can be hosting the domain. The AAAA record can be utilized to facilitate identifying, finding, or locating the IPV6 address of a device connected to the communication network 102 based on a name.

It is to be appreciated and understood that these are merely a few non-limiting examples of types of DNS or resource records that can be stored in the DNS name servers (e.g., DNS name server 110, DNS name server 112, and/or other DNS name server), and, in accordance with various embodiments, the DNS name servers can store other types of DNS or resource records as well.

In some embodiments, the communication network 102 can comprise or be associated with DNS resolver components, such as DNS resolver components 114, 116, 118, 120, 122, and/or 124, that can be respectively associated with respective DNS name servers (e.g., DNS name server 110, DNS name server 112, and/or other DNS name server). A DNS resolver component (DNS RSV) (e.g., 114, 116, 118, 120, 122, or 124) can be employed to process a DNS query (e.g., a recursive, non-recursive, or iterative DNS query) received from an associated NF (e.g., 104, 106, or 108), identify, determine, and/or retrieve desired (e.g., requested or queried) DNS record(s) from a DNS name server (e.g., 110 or 112) based at least in part on the results of analyzing the DNS query and searching the DNS name server for the DNS record(s). The appropriate DNS name server (e.g., 110 or 112) that has the desired (e.g., requested or queried) DNS record can provide the desired DNS record (e.g., information relating to or a copy of the desired DNS record) to the DNS resolver component, and the DNS resolver component can provide the desired DNS record(s), or information obtained from the desired DNS record(s) or determined based at least in part on the desired DNS record(s), to the NF in response to the DNS query. A DNS resolver component (e.g., 114, 116, 118, 120, 122, or 124) can convert or translate domain names (e.g., domain name in a query) into IP addresses. If the DNS resolver component (e.g., 114, 116, 118, 120, 122, or 124) is unable to find a desired DNS record in a DNS name server (e.g., 110 or 112), the DNS resolver component can return an error or notification message that can indicate that the desired DNS record was not found.

In certain embodiments, the communication network 102 can (e.g., optionally can) comprise or be associated with a configuration data store (CONFIG DATA STORE) 126 that can (e.g., optionally can) comprise information relating to network elements, including the NFs (e.g., 104, 106, and/or 108), that can be utilized to facilitate managing respective configuration parameters of respective network elements of the communication network 102. For example, the configuration data store 126 can comprise a network element configuration gold standard (GS) database that can comprise respective configuration parameter data items and/or other information associated with the respective network elements, including the respective NFs (e.g., 104, 106, and/or 108), that can facilitate managing the many (e.g., up to tens of thousands) of configuration parameters per network element instance, for many (e.g., up to hundreds of) instances of a network element type, and for many (e.g., dozens or hundreds) of various types of network elements. The respective configuration parameter data items and/or other information associated with the respective network elements can be applied or provided by the configuration data store 126 to the respective network elements, including the respective NFs (e.g., 104, 106, and/or 108), to facilitate configuring the respective network elements to enable them to perform their respective network functions and operations.

In some embodiments, in the configuration data store 126, with regard to respective configuration parameters (e.g., configuration parameter associated with a network element) that can be defined with respective URIs, FQDNs, or other resource-related identifiers, additional respective metadata items can be added or associated with the respective resource-related identifiers (e.g., by an alignment management component (AMC) 128 or other component of the system 100) and stored in the configuration data store 126, such as described herein.

In other embodiments, the AMC 128 can retrieve (e.g., directly retrieve) the respective configuration parameters from the respective network elements, including the respective NFs (e.g., 104, 106, and/or 108), rather than retrieving them from the configuration data store 126. For instance, the AMC 128 can comprise and/or employ one or more adapter or retrieval clients (e.g., client components) that can be utilized to facilitate or assist retrieval (e.g., direct retrieval) of the respective configuration parameters from the respective network elements, including the respective NFs (e.g., 104, 106, and/or 108).

Figure 2:
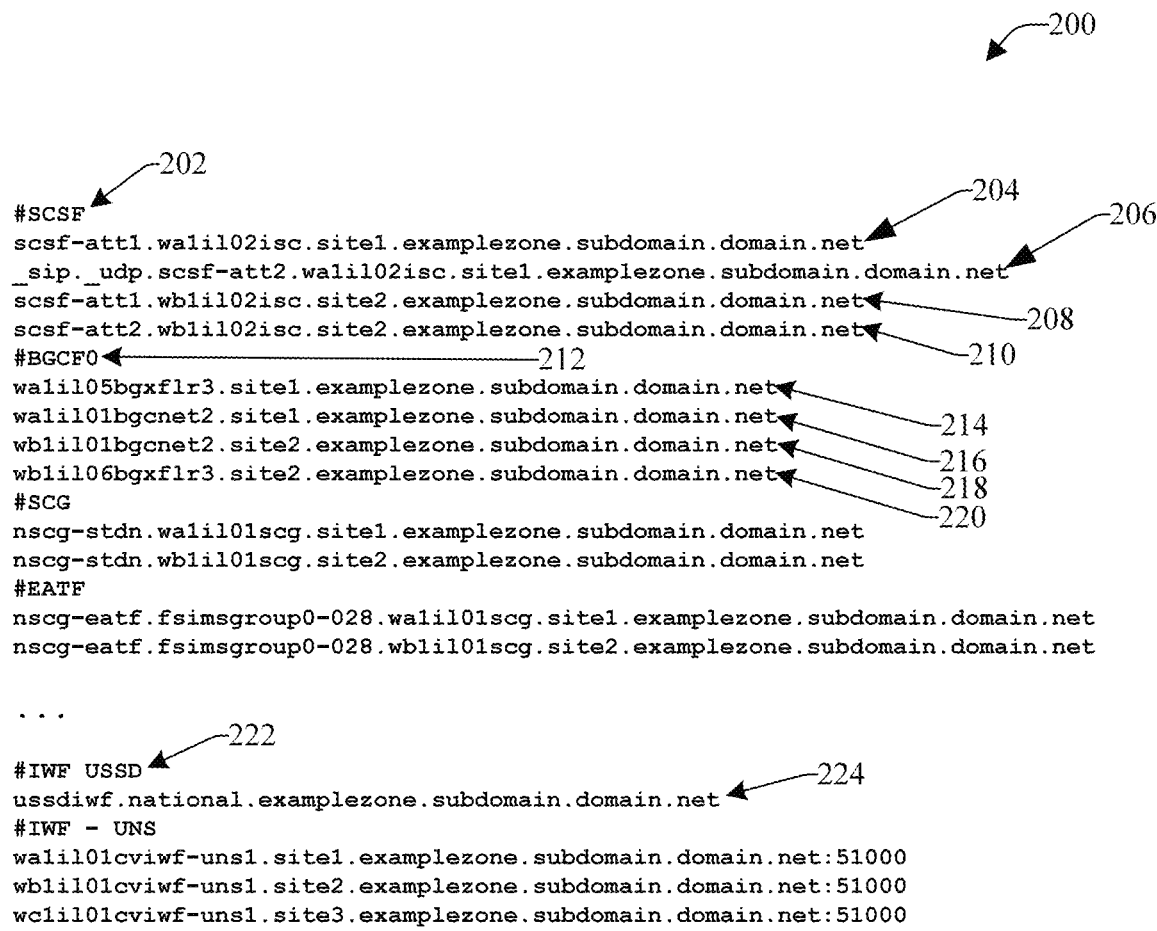
FIG. 2 depicts a diagram of a non-limiting example of resource-related identifiers (e.g., fully qualified domain names (FQDNs)) in a configuration parameter for a serving call session control function (S-CSCF) to contact various next-hops within the communication network, in accordance with various aspects and embodiments of the disclosed subject matter.

Referring to FIGS. 2-4 (along with FIG. 1), FIG. 2 depicts a diagram of a non-limiting example of resource-related identifiers (e.g., FQDNs) 200 in configuration parameters for an S-CSCF to contact various next-hops within the communication network 102, FIG. 3 depicts a diagram of a non-limiting example of DNS records 300 that can correspond to resource-related identifiers (e.g., FQDNs) in the configuration parameter for the S-CSCF, and FIG. 4 depicts yet another diagram of a non-limiting example of DNS records 400 that can correspond to resource-related identifiers (e.g., FQDNs) in the configuration parameter for the S-CSCF, in accordance with various aspects and embodiments of the disclosed subject matter. The respective DNS records 300 and 400 of FIGS. 3 and 4 can be stored in respective DNS name servers (e.g., DNS name server 110, DNS name server 112, and/or other DNS name server) and/or another desired data storage location(s), such as described herein.

With regard to FIG. 2, the configuration data items, such as the resource-related identifiers, presented in the example resource-related identifiers 200 of FIG. 2 can be stored in the configuration data store 126 and/or another desired data storage location(s), such as described herein. As illustrated in FIG. 2, there can be various resource-related identifiers associated with various NFs that can facilitate or enable NFs to contact various next-hops within the communication network 102, such as described herein. For example, with regard to S-CSF 202, there can be resource-related identifiers 204, 206, 208, and 210, with regard to BGCF 212, there can be resource-related identifiers 214, 216, 218, and 220, with regard to IWF USSD 222, there can be resource-related identifier 224, and/or with regard to the other NFs (e.g., EATF, IWF-UNS, CPM, or other NF), there can be other resource-related identifiers associated therewith.

It is to be appreciated and understood the configuration parameter described in FIG. 2 is just one of thousands of configuration parameters that can be in one NF instance among hundreds of instances of the same NF deployed. Further, in some embodiments, there can be dozens of various types of NFs deployed in a same communication network (e.g., communication network 102).

As depicted in FIG. 3, there can be various DNS records 300 of various record types. For example, the DNS records 300 can comprise various AAAA records, such as AAAA records 302, 304, and 306, various SRV records, such as SRV record 308, and/or other DNS records. As illustrated in FIG. 4, there can be various DNS records 400 of various record types. For instance, the DNS records 400 can comprise various AAAA records, such as AAAA record 402, various SRV records, such as SRV records 404, 406, and 408, and/or other DNS records.

Figure 5:
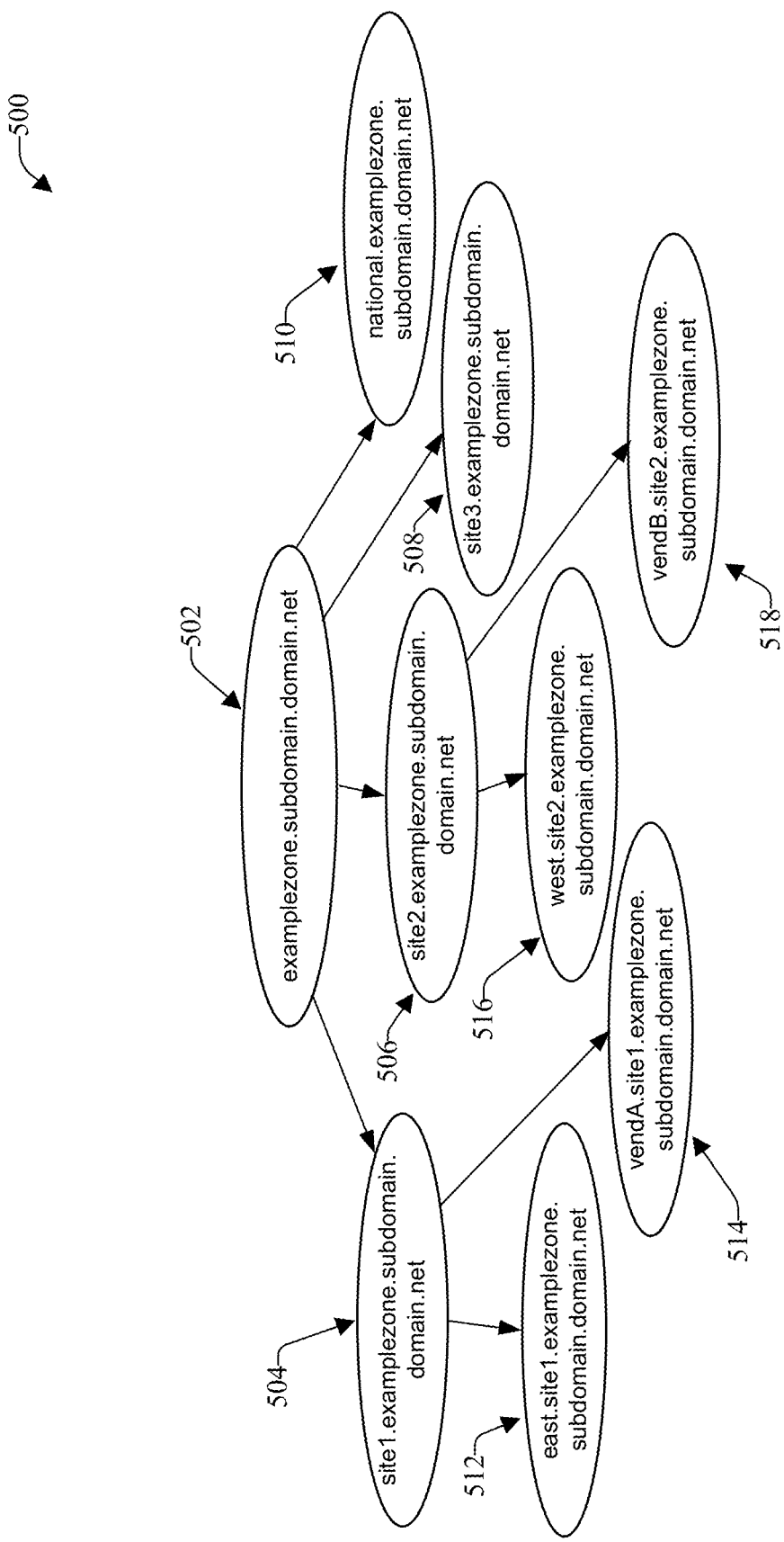
FIG. 5 depicts a diagram of a non-limiting example DNS hierarchy associated with the DNS records associated with the communication network, in accordance with various aspects and embodiments of the disclosed subject matter.

The respective DNS records can be associated with a desired DNS hierarchy. Referring briefly to FIG. 5 (along with FIGS. 1 and 3-4), FIG. 5 depicts a diagram of a non-limiting example DNS hierarchy 500 associated with the DNS records associated with the communication network 102, in accordance with various aspects and embodiments of the disclosed subject matter. There can be, for example, hundreds of thousands of DNS records associated with the example DNS hierarchy 500 and communication network 102.

In some embodiments, the example DNS hierarchy 500 can comprise or be divided into one or more domains and respectively associated sub-domains. For instance, the example DNS hierarchy 500 can comprise one or more domains, such as domain 502 (e.g., examplezone.subdomain.domain.net), which can be in a first or highest level of the DNS hierarchy 500. The domain 502 can comprise or be divided (e.g., split or partitioned) into a desired number of sub-domains in the second, third, or other level (e.g., lower level) of the DNS hierarchy 500 based at least in part on geographical region, vendor associated with the communication network 102, physical or logical features of the communication network 102, services provided by or associated with (e.g., facilitated by) the communication network 102, and/or another desired factor or criteria. For example, the domain 502 can comprise or be divided into sub-domains, such as sub-domains 504, 506, 508, and 510 (e.g., in the second level of the DNS hierarchy), wherein sub-domain 504 can be associated with a site 1 region of the communication network 102, sub-domain 506 can be associated with a site 2 region of the communication network 102, sub-domain 508 can be associated with a Site 3 region of the communication network 102, and/or sub-domain 510 can be associated with a national region of the communication network 102.

In accordance with the example DNS hierarchy 500, respective sub-domains, such as sub-domains 504 and 506, can comprise or can be divided into respective sub-domains, such as sub-domains 512, 514, 516, and 518 (e.g., in the third level of the DNS hierarchy). The sub-domain 512 can be a sub-domain of sub-domain 504 and can be associated with the cast site 1 region of the communication network 102, and the sub-domain 514 can be a sub-domain of sub-domain 504 and can be associated with Vendor A (vendA) associated with the site 1 region of the communication network 102. The sub-domain 516 can be a sub-domain of sub-domain 506 and can be associated with the west site 2 region of the communication network 102, and the sub-domain 518 can be a sub-domain of sub-domain 506 and can be associated with Vendor B (vendB) associated with the site 2 region of the communication network 102. The respective domains (e.g., domain 502) and/or respective sub-domains (e.g., 504, 506, 508, 510, 512, 514, 516, and/or 518) can be associated with respective DNS name servers (e.g., DNS name server 110, DNS name server 112, and/or other DNS name server), as desired or specified, in accordance with the defined network management criteria. It is to be appreciated and understood that the example DNS hierarchy is merely one non-limiting example of a DNS hierarchy, and, in accordance with various embodiments of the disclosed subject matter, the communication network 102 can comprise or be associated with a DNS hierarchy that can comprise other, more, or different domains, sub-domains, hierarchical levels, and/or other hierarchy features than depicted in the example DNS hierarchy.

In accordance with various embodiments, the communication network 102 can comprise or be associated with the AMC 128 that can desirably (e.g., automatically, efficiently, accurately, suitably, enhancedly, or optimally) align, validate alignment between, and/or report misalignment between wireless and wireline network element configuration and DNS records that are stored or are supposed (e.g., specified or expected) to be stored in the respective DNS name servers (e.g., DNS name server 110, DNS name server 112, and/or other DNS name server). The AMC 128 can manage and/or perform various operations and processing relating to aligning, validating alignment between, and/or reporting misalignment between wireless and wireline network element configuration and the DNS records.

Figure 6:
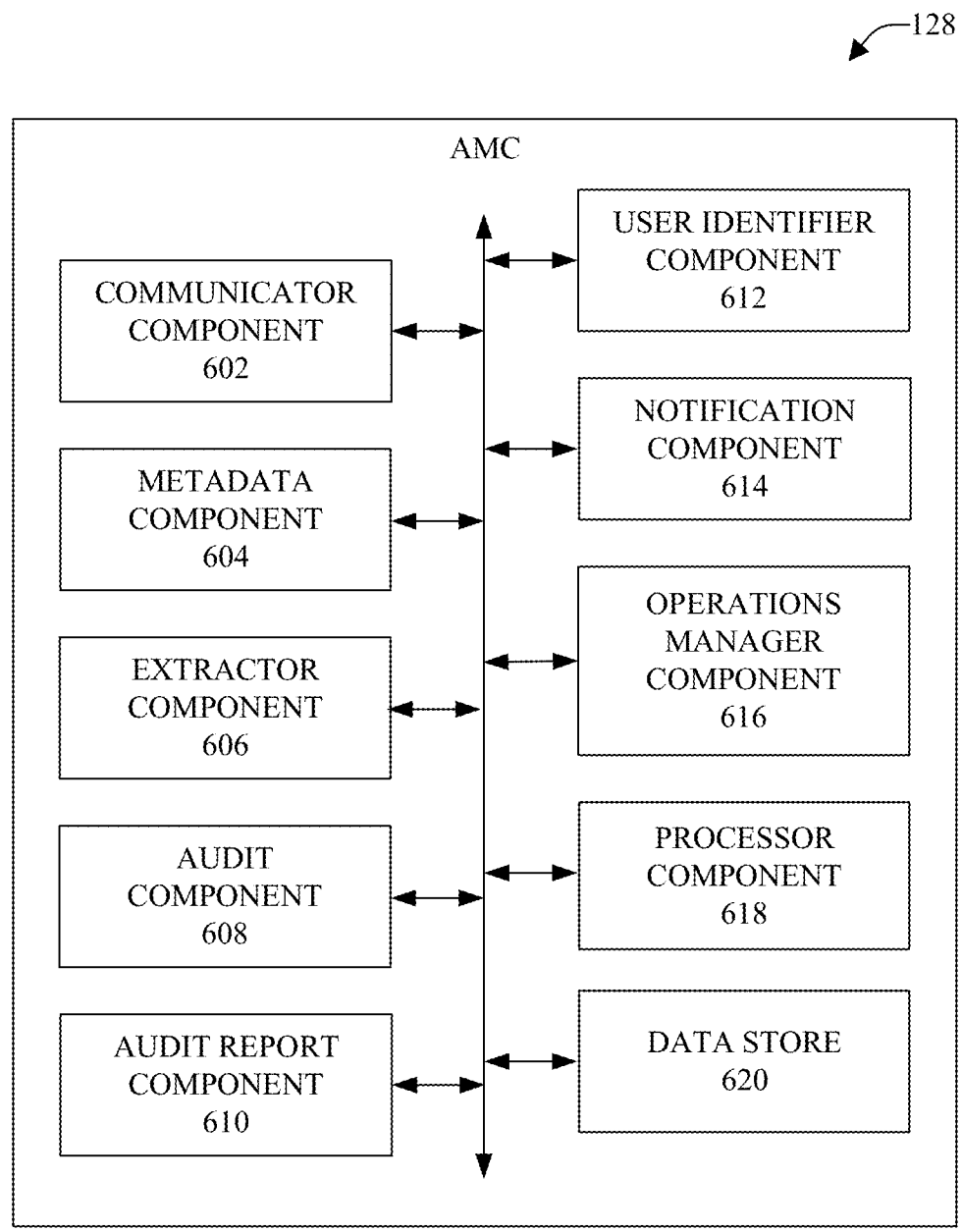
FIG. 6 depicts a block diagram of an alignment management component, in accordance with various aspects and embodiments of the disclosed subject matter.

Referring to FIG. 6 (along with FIG. 1), FIG. 6 depicts a block diagram of the AMC 128, in accordance with various aspects and embodiments of the disclosed subject matter. The AMC 128 can comprise a communicator component 602, a metadata component 604, an extractor component 606, an audit component 608, an audit report component 610, a user identifier component 612, a notification component 614, an operations manager component 616, a processor component 618, and a data store 620.

The communicator component 602 can receive information (e.g., information relating to network elements, metadata items, information relating to DNS records; or other desired information) from other components or devices (e.g., the configuration data store 126, the DNS name servers (e.g., 110 and/or 112), communication device(s) (CD(s)) 130 and/or 132, or other components or devices). The communicator component 602 also can transmit desired information (e.g., audit reports relating to missing DNS records, delta comparison results, baseline comparison results, or other desired information) to other components or devices (e.g., communication device(s) 130 and/or 132).

In certain embodiments, the metadata component 604 can generate respective metadata items, and can associate (e.g., link, map, or otherwise associate) the respective metadata items with or to respective resource-related identifiers (e.g., URIs, FQDNs, or other resource-related identifiers) and/or respective configuration parameters. The metadata component 604 (or another component of the AMC 128) can access, scan, or search the configuration data store 126 to identify or determine resource-related identifiers and/or configuration parameters for which metadata items can be desired, and/or can retrieve resource-related identifiers, configuration parameters, and/or information relating thereto from the configuration data store 126, to facilitate generating the respective metadata items and/or associating the respective data items with or to the respective resource-related identifiers and/or the respective configuration parameters. In accordance with various embodiments, a metadata item associated with a resource-related identifier (e.g., URI, FQDN, or other resource-related identifier) and/or network element (e.g., NF 104, 106, or 108) can indicate or specify whether the resource-related identifier is associated with (e.g., requires) a corresponding DNS record, can indicate or specify a type of DNS record (e.g., SRV, NAPTR, A, AAAA, or other type of DNS record) that can be associated with the resource-related identifier, or can indicate or specify a DNS name server of the respective DNS name servers (e.g., DNS name server 110, DNS name server 112, and/or other DNS name server) where the DNS record is indicated, specified, expected, or supposed to be stored.

Figure 7:
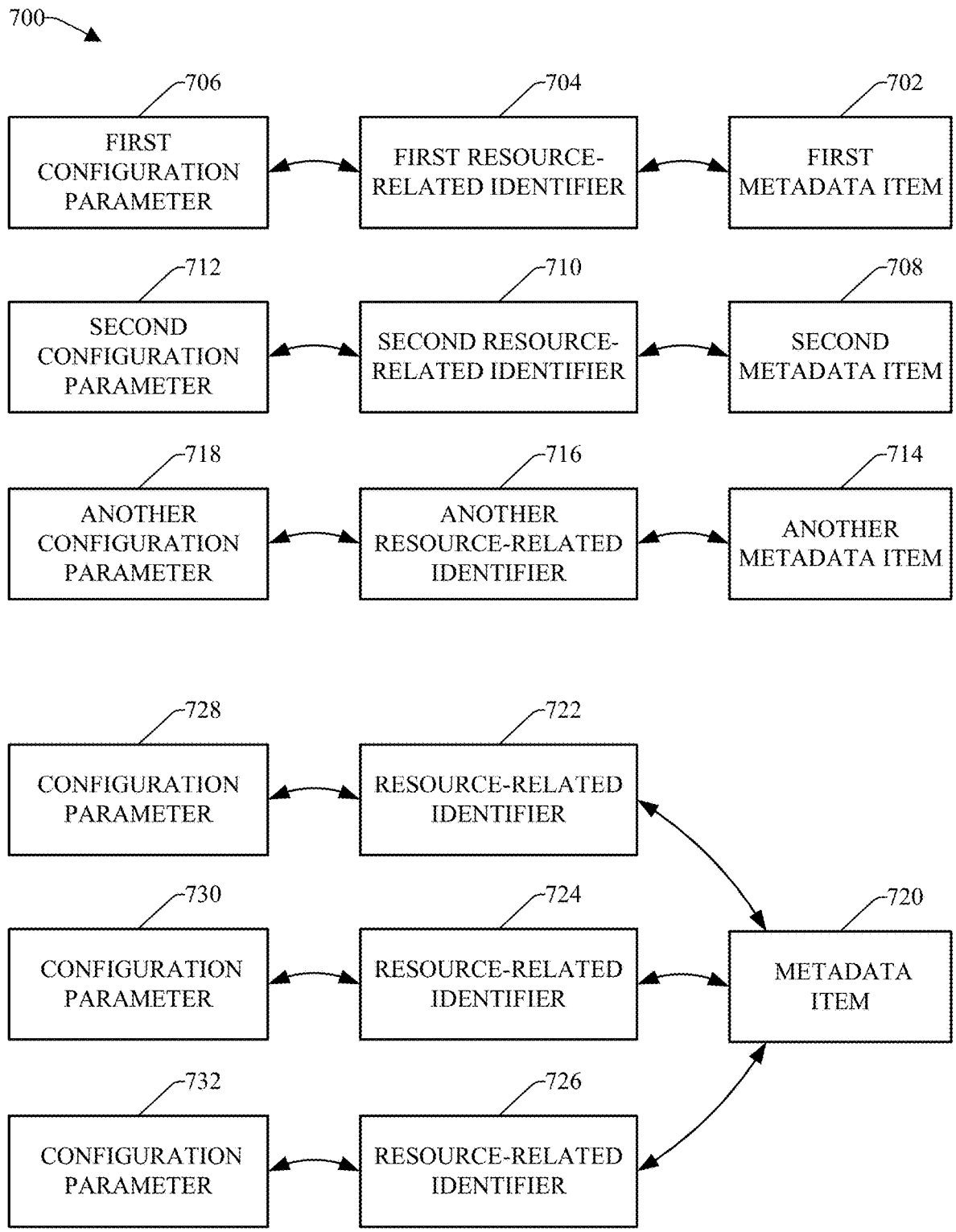
FIG. 7 depicts a block diagram of non-limiting example metadata items and associated resource-related identifiers and/or configuration parameters, in accordance with various aspects and embodiments of the disclosed subject matter.

Referring briefly to FIG. 7 (along with FIGS. 1 and 6), FIG. 7 depicts a block diagram of non-limiting example metadata items 700 and associated resource-related identifiers and/or configuration parameters, in accordance with various aspects and embodiments of the disclosed subject matter. The metadata component 604 can determine and generate respective metadata items, such as the example metadata items 700, based at least in part on the results of analyzing information relating to the resource-related identifiers, the configuration parameters, the DNS records respectively associated therewith, and/or the DNS name servers. The metadata component 604 can associate (e.g., link or map) the respective metadata items with or to the respective resource-related identifiers (e.g., FQDNs, URIs, or other resource-related identifiers) and/or the respective configuration parameters. In some embodiments, the example metadata items 700 can comprise a first metadata item 702 that can be associated with a first resource-related identifier 704 and/or a first configuration parameter 706; a second metadata item 708 that can be associated with a second resource-related identifier 710 and/or a second configuration parameter 712; and/or another metadata item 714 that can be associated with another resource-related identifier 716 and/or another configuration parameter 718.

In certain embodiments, additionally or alternatively, the example metadata items 700 can comprise metadata item 720 that can be associated with multiple resource-related identifiers, such as resource-related identifiers 722, 724, and/or 726, and/or multiple configuration parameters, such as configuration parameters 728, 730, and/or 732. For instance, if the metadata component 604 determines that the multiple resource-related identifiers (e.g., 722, 724, and/or 726), and/or multiple configuration parameters (e.g., 728, 730, and/or 732) are stored in the same DNS name server (e.g., 110) and/or are associated with the same type of DNS records (e.g., NAPTR records, SRV records, A records, AAAA records, or other type of DNS records), the metadata component 604 can determine that the multiple resource-related identifiers (e.g., 722, 724, and/or 726) and/or multiple configuration parameters (e.g., 728, 730, and/or 732) can be aggregated together, and the same metadata item (e.g., 718) can be utilized for and associated with the multiple resource-related identifiers (e.g., 722, 724, and/or 726) and/or multiple configuration parameters (e.g., 728, 730, and/or 732), instead of having separate respective metadata items for the respective resource-related identifiers and/or the respective configuration parameters. Accordingly, the metadata component 604 can determine and generate the metadata item 720, based at least in part on the results of analyzing the information relating to the multiple resource-related identifiers (e.g., 722, 724, and/or 726), the multiple configuration parameters (e.g., 728, 730, and/or 732), the DNS records respectively associated therewith, and/or the DNS name servers, and can associate the metadata item 720 with the multiple resource-related identifiers (e.g., 722, 724, and/or 726) and/or multiple configuration parameters (e.g., 728, 730, and/or 732).

The metadata component 604 can structure the metadata items (e.g., 702, 708, 714, and/or 720) to comprise a desired number of bits of metadata that can be arranged in a desired order and/or format, wherein respective bits or subgroups of bits of metadata of a metadata item can indicate or specify respective information relating to whether a resource-related identifier is associated with (e.g., has or requires) a corresponding DNS record, a type of DNS record that can be associated with the resource-related identifier, a DNS name server where the DNS record is specified, expected, or supposed to be stored, whether a DNS record or associated DNS name server is or are associated with a demilitarized zone (DMZ) (or other data security zone) or not, a particular DMZ (or other particular data security zone) with which a DNS record or associated DNS name server is associated (if associated with a particular DMZ or other particular data security zone), and/or other desired features or attributes (e.g., characteristics) associated with the respective DNS records, respective DNS name servers, respective domains or sub-domains, respective geographical, physical, or logical portions (e.g., regions) of the communication network 102, in accordance with the defined network management criteria.

In some embodiments, the AMC 128, employing the extractor component 606, can retrieve (e.g., extract, access, obtain, or receive) respective configuration parameter data items (e.g., copies of respective configuration parameter data items) relating to the respective configuration parameters associated with respective resource-related identifiers (e.g., FQDNs, URIs, or other type of resource-related identifier), and respective metadata items (e.g., copies of respective metadata items) associated with the respective resource-related identifiers, from the configuration data store 126, or can directly retrieve (e.g., utilizing one or more adapter or retrieval clients) the respective configuration parameter data items relating to the respective configuration parameters from the respective network elements, such as the respective NFs (e.g., 104, 106, and/or 108), rather than retrieving them from the configuration data store 126. The configuration parameter data items can comprise information relating to the respective configuration parameters associated with respective network elements (e.g., NFs 104, 106, and/or 108), and/or associated respective resource-related identifiers (e.g., URIs, FQDNs, or other resource-related identifiers).

The AMC 128, employing the audit component 608, can perform audits, which can be complete (e.g., full) audits of DNS records associated with the network elements (e.g., NFs) or partial audits of DNS records associated with some desired network elements. In some embodiments, the AMC 128, employing the audit component 608, can analyze the respective metadata items and/or the respective configuration parameter data items associated therewith. Based at least in part on the result of analyzing (e.g., by the audit component 608) the respective metadata items and/or the respective configuration parameter data items associated therewith, the extractor component 606 can determine, for each resource-related identifier (e.g., URI, FQDN, or other type of resource-related identifier) associated with a configuration parameter, whether a particular resource-related identifier, is supposed (e.g., specified, expected, or required) to have a DNS record associated therewith, can determine or identify respective DNS records associated with the respective metadata items and/or the respective configuration parameter data items (e.g., the respective resource-related identifiers and respective configuration parameters), and/or can determine the respective DNS name servers (e.g., DNS name server 110, DNS name server 112, and/or other DNS name server) in which the respective DNS records reside (e.g., are stored). For example, a first metadata item can indicate or specify that a first resource-related identifier does not have or is not required to have a DNS record. In such example case, the extractor component 606 can determine that no DNS record is to be searched for or retrieved from the DNS name servers (e.g., DNS name server 110, DNS name server 112, and/or other DNS name server). As another example, a second metadata item can indicate or specify that a second resource-related identifier is supposed (e.g., specified, expected, or required) to have a DNS record, and that DNS record is supposed to be stored in a particular DNS name server (e.g., DNS name server 110). In response, the extractor component 606 can request, search for, retrieve, and/or attempt to retrieve the DNS record from the particular DNS name server.

With regard to each resource-related identifier for which a DNS record is supposed (e.g., required) to be associated, the extractor component 606 can retrieve or extract, or at least attempt to retrieve or extract, from the respective DNS name servers (e.g., DNS name server 110, DNS name server 112, and/or other DNS name server), the respective DNS records (e.g., copies of respective DNS records), which can comprise respective DNS record data items, associated with the respective metadata items and/or the respective configuration parameter data items. In other embodiments, the extractor component 606 can retrieve or extract DNS records from the DNS name servers (e.g., DNS name server 110, DNS name server 112, and/or other DNS name server) without regard to analysis of the respective metadata items and/or the respective configuration parameter data items. For instance, the extractor component 606 can retrieve or extract DNS records from the DNS name servers, and the audit component 608 can match up, or attempt to match up, the respective resource-related identifiers with the respective DNS records based at least in part on the respective metadata items.

In certain embodiments, instead of the AMC 128 querying the DNS name servers (e.g., DNS name server 110, DNS name server 112, or other DNS name server) for DNS records on an individual basis in connection with an audit or for other reason, at a desired time(s), the AMC 128 can retrieve DNS records from the DNS name servers (e.g., DNS name server 110, DNS name server 112, or other DNS name server) and can store the DNS records in the data store 620. When the extractor component 606, the audit component 608, or other component of the AMC 128 desire to access or utilize the DNS records, the extractor component 606, the audit component 608, or other component of the AMC 128 can access or retrieve the DNS records from the data store 620. For instance, the extractor component 606 or the audit component 608 can retrieve the DNS records, or a desired portion thereof, from the data store 620 in connection with performing an audit, such as described herein. The AMC 128 can update the DNS records stored in the data store 620 at a desired time or on a desired basis (e.g., periodic basis, aperiodic or dynamic basis, or in response to a notification of a change in the DNS records). By not having the AMC 128 query the DNS name servers every time a DNS record is desired, the disclosed subject matter can avoid constant querying of the DNS name servers, which also are utilized to perform and support other network operations.

The audit component 608 can analyze the respective configuration parameter data items and the respective DNS record data items of the respective DNS records (and/or the respective metadata items (if not already analyzed by the audit component 608 or other component of the AMC 128)). With regard to each resource-related identifier for which a DNS record is supposed (e.g., specified or required) to be associated, based at least in part on the result of analyzing the respective configuration parameter data items and the respective DNS record data items, the audit component 608 can determine whether the resource-related identifier has a corresponding DNS record stored in the DNS name server (e.g., DNS name server 110, DNS name server 112, or other DNS name server) indicated by the associated metadata item.

With regard to each resource-related identifier for which a DNS record is supposed (e.g., required) to be associated, if the audit component 608 determines that the corresponding DNS record is not detected as being stored in the respective DNS name servers (e.g., is not detected as being stored in the DNS name server indicated by the corresponding metadata item), the audit component 608 can flag a configuration parameter or associated resource-related identifier as being associated with a missing DNS record and/or can generate a missing DNS record data item that can indicate the corresponding DNS record is determined not to be stored in the respective DNS name servers. The audit report component 610 can generate an audit report comprising one or more missing respective DNS record data items with regard to one or more respective DNS records that the audit component 608 has determined to be missing from the respective DNS name servers (e.g., DNS name server 110, DNS name server 112, or other DNS name server).

As an example of detecting a missing DNS record that is missing from a DNS name server, with regard to FIGS. 2 and 3 (along with FIGS. 1 and 6), the audit component 608 can retrieve configuration parameter data from the configuration data store 126, wherein the configuration parameter data can include a certain resource-related identifier, for example, scsf-att1.wb1il02isc.site2.examplezone.subdomain2.domain.net (e.g., an FQDN), associated with the SCSF and the metadata item associated with the certain resource-related identifier with regard to a configuration parameter associated with the S-CSCF. Based at least in part on the results of analyzing the metadata item associated with the certain resource-related identifier, the audit component 608 can determine that the corresponding DNS record that corresponds to the certain resource-related identifier and associated configuration parameter is supposed (e.g., specified or expected) to be stored in a particular DNS name server (e.g., 110). As part of the audit, the audit component 608 can retrieve DNS records from the particular DNS name server (e.g., 110) and can analyze those DNS records (e.g., DNS records 300 of FIG. 3) to determine whether the corresponding DNS record, which can correspond to the certain resource-related identifier, is in those DNS records. Based at least in part on the results of the analysis of those DNS records (e.g., DNS records 300 of FIG. 3), the audit component 608 can determine that the corresponding DNS record is missing from those DNS records (e.g., the audit component 608 can determine that no corresponding DNS record, which corresponds to the certain resource-related identifier (e.g., scsf-att1.wb1il02isc.site2.examplezone.subdomain2.domain.net), has been detected or found in the DNS records obtained from the particular DNS name server 110). Accordingly, the audit component 608 can generate a missing DNS record data item that can indicate that the DNS record, which corresponds to the certain resource-related identifier, is missing from the particular DNS name server, and such missing DNS record data item relating to that missing DNS record can be included in the audit report.

As an example of verifying that a corresponding DNS record is stored in a DNS name server, with regard to FIGS. 2 and 3 (along with FIGS. 1 and 6), the audit component 608 can retrieve configuration parameter data from the configuration data store 126, wherein the configuration parameter data can include resource-related identifier 204 associated with SCSF 202 and the metadata item associated with the resource-related identifier 204 with regard to a configuration parameter associated with the S-CSCF. Based at least in part on the results of analyzing the metadata item associated with the resource-related identifier 204, the audit component 608 can determine that the corresponding DNS record that corresponds to the resource-related identifier 204 and associated configuration parameter is supposed to be stored in a particular DNS name server (e.g., 110). The audit component 608 can retrieve DNS records from the particular DNS name server (e.g., 110) and can analyze those DNS records (e.g., DNS records 300 of FIG. 3) to determine whether the corresponding DNS record, which can correspond to the resource-related identifier 204, is in those DNS records. Based at least in part on the results of the analysis of those DNS records (e.g., DNS records 300 of FIG. 3), the audit component 608 can determine that the corresponding DNS records (e.g., AAAA records 302, 304, and 306 of FIG. 3) are verified as being stored in the particular DNS name server (e.g., the audit component 608 can determine that the corresponding DNS records, which correspond to the resource-related identifier 204 (e.g., scsf-att1.wa1il02isc.site1.examplezone.subdomain.domain.net) have been detected or found in the DNS records obtained from the particular DNS name server 110). Accordingly, in some embodiments, the audit component 608 can generate a verified DNS record data item that can indicate that the DNS records (e.g., AAAA records 302, 304, and 306 of FIG. 3), which correspond to the resource-related identifier 204, have been verified as being stored the particular DNS name server (e.g., 110), and such verified DNS record data item relating to the verified DNS records can be included in the audit report (or, in other embodiments, can be omitted from the audit report, since those DNS records have been verified).

As another example of detecting a missing DNS record that is missing from a DNS name server, with regard to FIG. 4 (along with FIGS. 1 and 6), the audit component 608 can retrieve configuration parameter data from the configuration data store 126, wherein the configuration parameter data can include a resource-related identifier, for example, cviwf.examplezone.subdomain2.domain.net (e.g., an FQDN) and the metadata item associated with the resource-related identifier with regard to a configuration parameter associated with the S-CSCF. Based at least in part on the results of analyzing the metadata item associated with the resource-related identifier (e.g., cviwf.examplezone.subdomain2.domain.net), the audit component 608 can determine that the corresponding DNS record, which corresponds to the resource-related identifier and associated configuration parameter, is supposed (e.g., specified or expected) to be stored in a certain DNS name server (e.g., 112). As part of the audit, the audit component 608 can retrieve DNS records from the certain DNS name server (e.g., 112) and can analyze those DNS records (e.g., DNS records 400 of FIG. 4) to determine whether the corresponding DNS record, which can correspond to the resource-related identifier, is in those DNS records. In other embodiments, the AMC 128 can have the DNS records stored in the data store, such as described herein, instead of the AMC 128 querying the DNS name servers (e.g., DNS name server 110, DNS name server 112, or other DNS name server) for DNS records on an individual basis in connection with an audit (or for other reason). At a desired time(s) (e.g., a time of performing an audit, or other desired operation or function), the audit component 608, extractor component 606, or other component of the AMC 128 can retrieve desired DNS records from the data store 620. Based at least in part on the results of the analysis of those DNS records (e.g., DNS records 400 of FIG. 4), the audit component 608 can determine that the corresponding DNS record is missing from those DNS records (e.g., the audit component 608 can determine that no corresponding DNS record, which corresponds to the resource-related identifier (e.g., cviwf.examplezone.subdomain2.domain.net), has been detected or found in the DNS records obtained from the certain DNS name server 112). Accordingly, the audit component 608 can generate a missing DNS record data item that can indicate that the DNS record, which corresponds to the resource-related identifier (e.g., cviwf.examplezone.subdomain2.domain.net), is missing from the certain DNS name server (e.g., 112), and such missing DNS record data item relating to that missing DNS record can be included in the audit report.

Figure 8:
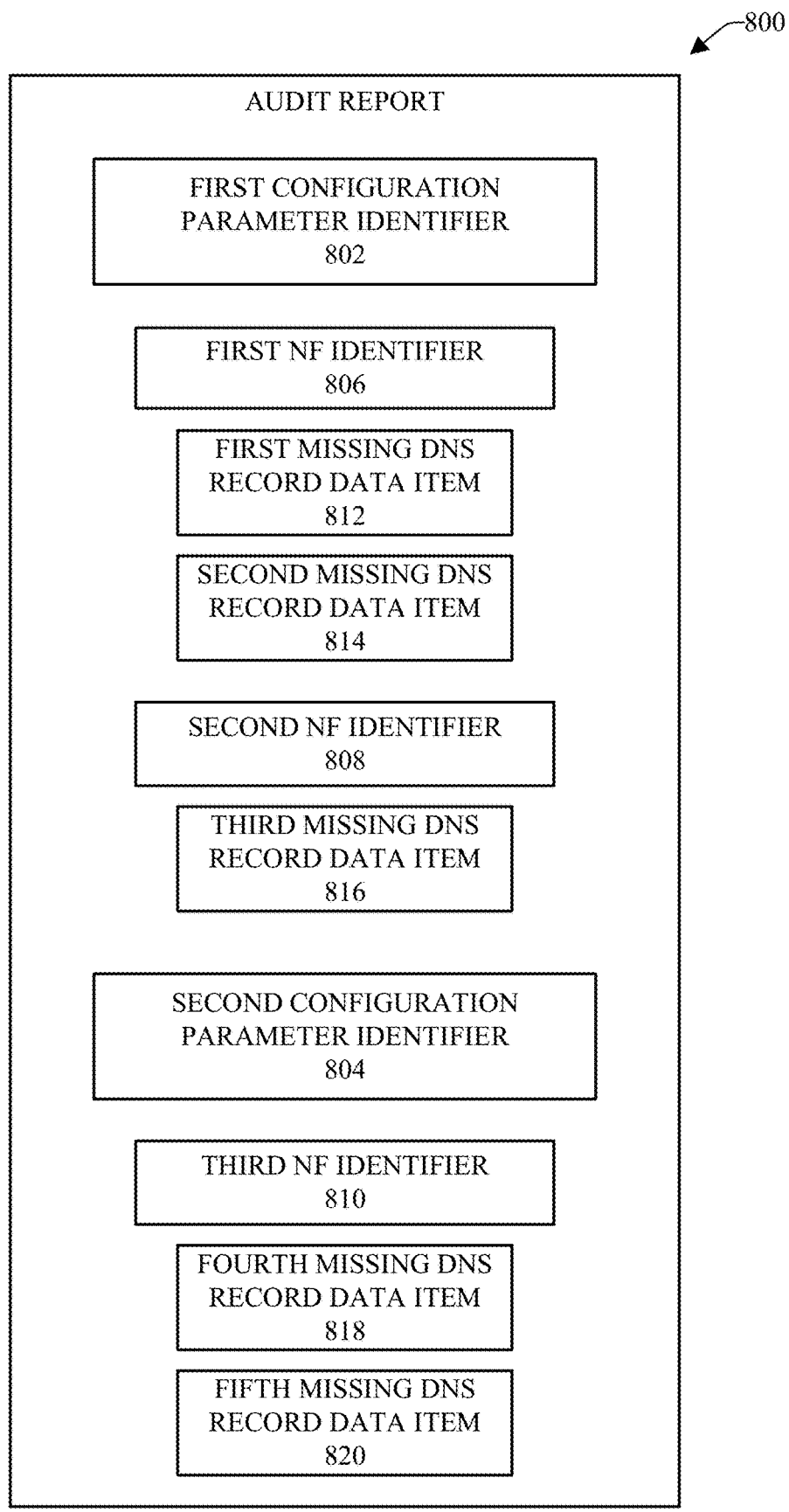
FIG. 8 illustrates a block diagram of an example audit report that can comprise information relating to missing DNS records associated with resource-related identifiers and/or configuration parameters associated with the communication network, in accordance with various aspects and embodiments of the disclosed subject matter.

Referring briefly to FIG. 8 (along with FIGS. 1 and 6), FIG. 8 illustrates a block diagram of an example audit report 800 that can comprise information relating to missing DNS records associated with resource-related identifiers and/or configuration parameters associated with the communication network 102, in accordance with various aspects and embodiments of the disclosed subject matter. In accordance with various embodiments, the audit report component 610 can generate an audit report to comprise, list, or present the information relating to the one or more missing respective DNS record data items with regard to the one or more respective DNS records on a per configuration parameter basis, a per NF (or other network element) basis, a per DNS record type basis, a per DNS name server basis, a per user (e.g., user responsible for or otherwise associated with the missing DNS records) basis, and/or per another desired attribute of basis. In other embodiments, the audit report component 610 can generate an audit report to comprise, list, or present the information relating to the one or more missing respective DNS record data items with regard to the one or more respective DNS records in another desired type of order and/or without regard to a particular basis. The respective information relating to respective missing DNS record data items can comprise, for example, respective configuration parameter identifiers that can correspond to the respective missing DNS records.

For example, the audit report component 610 can generate the example audit report 800 to comprise, list, or present the information relating to the one or more missing respective DNS record data items with regard to the one or more respective DNS records on a per configuration parameter and per NF basis. The example audit report 800 can comprise a first configuration parameter identifier 802 that can indicate or identify a first configuration parameter and a second configuration parameter identifier 804 that can indicate or identify a second configuration parameter associated with the configuration data store 126. The example audit report 800 also can include a first NF identifier 806 that can indicate or identify a first NF (e.g., SCSF or other first type of NF) associated with the first configuration parameter, a second NF identifier 808 that can indicate or identify a second NF (e.g., BGCF or other second type of NF) associated with the first configuration parameter, and a third NF identifier 810 that can indicate or identify a third NF (e.g., SCSF, BGCF, IWF, or other third type of NF) associated with the second configuration parameter.

The example audit report 800 also can comprise missing DNS record data items relating to missing DNS records that were detected by the audit component 608 during the audit. The missing DNS record data items can include a first missing DNS record data item 812 relating to a first missing DNS record that can be associated with the first NF and first configuration parameter, a second missing DNS record data item 814 relating to a second missing DNS record that also can be associated with the first NF and first configuration parameter, and a third missing DNS record data item 816 relating to a third missing DNS record that also can be associated with the second NF and first configuration parameter. A missing DNS record data item is not the missing DNS record itself (as that DNS record is missing or otherwise not available), but rather, a missing DNS record data item can comprise information relating to the missing DNS record, indicating that such DNS record is missing, describing the DNS record that is missing, and/or providing information that can facilitate identifying what DNS record is missing. For instance, the first missing DNS record data item 812 can comprise information relating to or regarding a first configuration parameter identifier that can correspond to the first missing DNS record, the second missing DNS record data item 814 can comprise information relating to or regarding a second configuration parameter identifier that can correspond to the second missing DNS record, and the third missing DNS record data item 816 can comprise information relating to or regarding a third configuration parameter identifier that can correspond to the third missing DNS record. The missing DNS record data items also can comprise a fourth missing DNS record data item 818 relating to a fourth missing DNS record that can be associated with the third NF and second configuration parameter, a fifth missing DNS record data item 820 relating to a fifth missing DNS record that also can be associated with the third NF and second configuration parameter. The fourth missing DNS record data item 818 can comprise information relating to or regarding a fourth configuration parameter identifier that can correspond to the fourth missing DNS record, and the fifth missing DNS record data item 820 can comprise information relating to or regarding a fifth configuration parameter identifier that can correspond to the fifth missing DNS record. In some embodiments, each of the respective missing DNS record data items (e.g., 812, 814, 816, 818, and/or 820) can comprise various types of information relating to the missing DNS records, such as information that can indicate or identify the DNS record (e.g., corresponding DNS record) that is missing, the configuration parameter, resource-related identifier (e.g., FQDN, URI, or other resource-related identifier), and/or NF (or other network element) associated with the missing DNS record, information that can identify the DNS name server where the DNS record was supposed to be stored, a domain or sub-domain of the DNS hierarchy associated with the missing DNS records, a user associated with the missing DNS records, and/or other desired information relating to the missing DNS record.

In some embodiments, if the audit component 608 determines that a DNS record associated with a metadata item is stored in a DNS name server (e.g., DNS name server 110), the audit component 608 can generate a verified DNS record data item that can indicate that the DNS record is determined to be stored in the DNS name server. In certain embodiments, the audit report component 610 can include such verified DNS record data item in the audit report. In other embodiments, if the audit component 608 determines that a DNS record associated with a metadata item is stored in a DNS name server (e.g., DNS name server 110), the audit component 608 can omit (e.g., bypass) generation of a verified DNS record data item and/or the audit report component 610 can omit inclusion of the verified DNS record data item in the audit report (e.g., the audit report component 610 can include missing respective DNS record data items in the audit report, while omitting verified DNS record data items from the audit report).

The AMC 128, employing the communicator component 602, can communicate the audit report, or a desired portion thereof, to one or more users (e.g., one or more network operators or other users) who can be responsible (e.g., who are indicated or determined to be responsible) for resolving the issue of the one or more missing DNS records. In certain embodiments, in response to determining that a DNS record is missing, the AMC 128, employing the user identifier component 612, can access or search (e.g., query) user-related data stored in the data store 620, which can comprise a user data store, based at least in part on information (e.g., the resource-related identifier, the configuration parameter, the NF (e.g., 104, 106, or 108) associated with the resource-related identifier, the associated metadata item, DNS record-related data, information regarding the DNS name server, or other information) of or associated with the resource-related identifier and/or the missing DNS record. For instance, in the user-related data stored in the user data store, a user identifier (e.g., name of a user, employment role or department associated with the user, and/or other user identifier), associated user contact information, and/or other desired user-related information can be associated with the information of or associated with the resource-related identifier, the configuration parameter, and/or the missing DNS record. Based at least in part on the accessing or searching of the user data store (e.g., using the information of or associated with the resource-related identifier, configuration parameter, NF, and/or the missing DNS record), the user identifier component 612 can determine a user or group of users associated with the missing DNS record associated with the resource-related identifier, configuration parameter, and/or NF. The user(s) can be, for example, a network operator, a network supervisor or manager, or other desired user (e.g., other network person, or other user employed outside of the communication network) who can be responsible for resolving or correcting the issue of the missing DNS record (and/or other similar missing DNS records). The user contact information can comprise, indicate, or specify a phone number(s) and/or message account(s) (e.g., email account(s), text message account(s), or other type of message account(s)) associated with the user or group of users (e.g., a group of users responsible for resolving or correcting issues relating to missing DNS records associated with a particular NF). The AMC 128, employing the notification component 614, can utilize the user contact information (e.g., phone number, email address, or other contact information) to contact the user or group of users to provide (e.g., communicate, present, or display) the audit report, or portion thereof (e.g., portion of the audit report comprising information relating to the missing DNS record(s) that can be relevant to the user(s) or with regard to which the user(s) is authorized to receive), to the user(s) and/or a communication device(s) (e.g., 130) or message account(s) (e.g., email account(s), text message account(s), voicemail account(s), or other message account(s)) associated with the user(s), notify the user(s) of the missing DNS record(s), and/or request that the user(s) resolve or correct the issue(s) of the missing DNS record(s).

The audit report component 610 also can generate the audit report to allow grouping of information (e.g., information items relating to missing DNS records) by network element (e.g., NF 104, NF 106, or NF 108), and can classify the respective information items based at least in part on type of DNS or resource record (e.g., NAPTR, SRV, A, AAAA, or other type of DNS or resource record). The information contained in the audit report also can be searchable by the user or associated communication device (e.g., 130). For instance, the user (e.g., employing the communication device 130) can search the audit report for desired information relating to a configuration parameter or missing DNS record and can extract the desired information from the audit report, which, if and as desired, can be performed on per network element (e.g., NF 104, NF 106, or NF 108) basis, per DNS name server basis (e.g., DNS name server 110 or DNS name server 112), or other desired basis.

In accordance with various embodiments, the audit component 608 can determine and generate a delta comparison audit report that can show or indicate changes between a previous audit report and a current (or other) audit report, or a baseline comparison audit report that can show or indicate changes between baseline audit data relating to missing DNS records and audit report data relating to missing DNS records in a current (or other) audit report. For instance, the audit component 608 can retrieve a desired previous audit report (e.g., immediately previous audit report or another previous audit report) from the data store 620 (e.g., the AMC 128 can store multiple iterations of previous audit reports or audit results in the data store 620 to facilitate generation of delta comparison reports), and can compare audit report data of the current (or other desired) audit report to previous audit report data of the previous audit report. The audit report data can relate to respective missing DNS records associated with certain respective configuration parameters and certain respective resource-related identifiers, and/or a current state (e.g., current state at the time of the generation of the audit report) of the communication network 102 with regard to network equipment (e.g., network servers, devices, or other equipment) employed in the communication network 102 and/or configuration of the network equipment in the communication network 102. The previous audit report data can relate to previous missing DNS records associated with respective configuration parameters and respective resource-related identifiers, and/or a previous state of the communication network 102 with regard to network equipment employed in the communication network 102 and/or configuration of the network equipment in the communication network 102. Based at least in part on the results of comparing the audit report data to the previous audit report data, the audit component 608 can determine the differences (and/or similarities) between the audit report data and the previous audit report data, wherein the differences can relate to, for example, difference between the number of missing DNS records in the audit report and the number of missing DNS records in the previous audit report, difference between the types of missing DNS records in the audit report and the types of missing DNS records in the previous audit report, differences (e.g., changes) in the network equipment utilized at the time of the audit report and the network equipment utilized at the time of the previous audit report (e.g., a server added to and/or server removed from the communication network 102), differences in the configuration of network equipment of the communication network 102 at the time of the audit report and the configuration of the network equipment of the communication network 102 at the time of the previous audit report and/or other differences between the audit report data and the previous audit report data.

The audit report component 610 can generate the delta comparison audit report that can comprise information relating to the delta comparison results comprising information relating to the differences (and/or similarities) between the audit report data and the previous audit report data. The delta comparison results in the delta comparison audit report can indicate or specify the differences between the audit report data and the previous audit report data, can indicate or specify whether there is improvement (e.g., reduction in missing DNS records) in alignment of network element configuration with DNS records stored in the DNS name servers and/or maintaining desired DNS records for configuration parameters in the DNS name servers (e.g., DNS name server 110, DNS name server 112, or other DNS name server), or whether there is an increase in missing DNS records, and/or can indicate changes in network equipment utilized by, and/or configuration of network equipment of, the communication network 102. The delta comparison results also can indicate if previously detected missing DNS records have been corrected by users such that the DNS name servers contain DNS records that previously were detected to be missing, and/or can indicate previously detected missing DNS records that continue to be missing (e.g., because the responsible user(s) has not rectified the issue of the previously detected missing DNS records). In the delta comparison audit report, the audit report component 610 can group respective information items of the delta comparison results of the delta comparison audit report into respective groups of information items based at least in part on a network element basis, a configuration parameter basis, a resource-related identifier basis, DNS record type basis, a DNS name server basis, a responsible user basis, and/or other desired basis. The notification component 614 can utilize the user contact information to provide (e.g., communicate, present, or display) the delta comparison audit report, or portion thereof, to the desired user and/or a communication device (e.g., 130) or message account (e.g., email account, text message account, voicemail account, or other message account) associated with the desired user for consideration or action (e.g., response or work action) by the user.

In some embodiments, the audit component 608 can retrieve baseline audit data (e.g., of a baseline audit report) from the data store 620, and can compare audit report data of the current (or other desired) audit report to the baseline audit data. The audit report data can relate to respective missing DNS records associated with certain respective configuration parameters and certain respective resource-related identifiers. The baseline audit data can relate to or represent a desired baseline(s) relating to alignment of network element configuration with DNS records stored in the DNS name servers (e.g., DNS name server 110, DNS name server 112, or other DNS name server), maintenance of DNS records in the DNS name servers, and/or missing DNS records missing from the DNS name servers. Based at least in part on the results of comparing the audit report data to the baseline audit data, the audit component 608 can determine the differences (and/or similarities) between the audit report data and the baseline audit data, wherein the differences can relate to, for example, difference between the number of missing DNS records in the audit report and the number (e.g., baseline number) of missing DNS records indicated in the baseline audit data, difference between the types of missing DNS records in the audit report and the types of missing DNS records indicated in the baseline audit data, and/or other differences between the audit report data and baseline values (e.g., baseline or threshold values relating to respective data types) provided or represented in the baseline audit data.

In certain embodiments, the audit component 608 can determine baseline audit data and/or one or more baseline values represented in the baseline audit data based at least in part on the results of analyzing previous audit report data, user input information provided by a user(s), and/or defined network management criteria relating to managing alignment between network element configuration and DNS records.

The audit report component 610 can generate the baseline comparison audit report that can comprise information relating to the baseline comparison results comprising information relating to the differences (and/or similarities) between the audit report data and the baseline audit data. The baseline comparison results in the baseline comparison audit report can indicate or specify the differences between the audit report data and the baseline audit data, or can indicate or specify whether the audit report indicates or shows that the alignment of network element configuration with DNS records stored in the DNS name servers is above, at, or below the baselines indicated or represented in the baseline audit data. In the baseline comparison audit report, the audit report component 610 can group respective information items of the baseline comparison results of the baseline comparison audit report into respective groups of information items based at least in part on a network element basis, a configuration parameter basis, a resource-related identifier basis, DNS record type basis, a DNS name server basis, a responsible user basis, and/or other desired basis. The notification component 614 can utilize the user contact information to provide (e.g., communicate, present, or display) the baseline comparison audit report, or portion thereof, to the desired user and/or a communication device (e.g., 130) or message account (e.g., email account, text message account, voicemail account, or other message account) associated with the desired user for consideration or action (e.g., response or work action) by the user.

In certain embodiments, an audit report, delta comparison audit report, or baseline comparison audit report can be utilized to assist platform level flow-through testing to verify all intended message paths associated with the communication network 102 (e.g., associated with network elements and/or DNS records associated with the communication network 102). For example, after a flow-through test script is executed, users (e.g., testers) can collect DNS query logs from all or desired network elements to compare with the audit report, delta comparison audit report, or baseline comparison audit report. If some resource-related identifiers (e.g., FQDNs, URIs, or other resource-related identifier) had not been resolved during the flow-through testing, this can indicate that a message path was not tested or a message path was not working. This can assist the users (e.g., test team of testers) by flagging or identifying failed or unverified message paths, and can facilitate the users opening tickets for the failed or unverified message paths and/or can enhance (e.g., improve) the test script for full, or at least fuller, coverage of all possible message paths associated with the communication network 102.

In some embodiments, the AMC 128 can comprise an operations manager component 616 that can control (e.g., manage) operations associated with the AMC 128. For example, the operations manager component 616 can facilitate generating instructions to have components (e.g., communicator component 602, metadata component 604, extractor component 606, audit component 608, audit report component 610, user identifier component 612, notification component 614, processor component 618, and data store 620) of or associated with the AMC 128 perform operations, and can communicate respective instructions to such respective components of or associated with the AMC 128 to facilitate performance of operations by the respective components of or associated with the AMC 128 based at least in part on the instructions, in accordance with the defined network management criteria and the defined network management algorithm(s) (e.g., network management algorithms, network element configuration-DNS records alignment, alignment validation, and/or alignment reporting algorithms, metadata algorithms, tagging and/or mapping algorithms, and/or artificial intelligence (AI), machine learning (ML), or neural network algorithms, as disclosed, defined, recited, or indicated herein by the methods, systems, and techniques described herein). The operations manager component 616 also can facilitate controlling data flow between the respective components of the AMC 128 and controlling data flow between the AMC 128 and another component(s) or device(s) (e.g., devices or components, such as a communication device, a network device or equipment, or other component or device) associated with (e.g., connected to) the AMC 128.

The processor component 618 can work in conjunction with the other components (e.g., communicator component 602, metadata component 604, extractor component 606, audit component 608, audit report component 610, user identifier component 612, notification component 614, operations manager component 616, and/or data store 620) to facilitate performing the various functions of the AMC 128. The processor component 618 can employ one or more processors, microprocessors, or controllers that can process data, such as information relating to NFs or other network elements, configuration parameters (e.g., configuration parameters associated with network elements), other parameters associated with the communication network 102, variables, resource-related identifiers (e.g., FQDNs, URIs, or other resource-related identifiers), metadata (e.g., metadata associated with configuration parameters, resource-related identifiers, and/or DNS records), URLs, domains, sub-domains, DNS records, DNS name servers, mapping of metadata items to configuration parameters, resource-related identifiers, and/or DNS records, audit reports, delta audit reports, baseline audit reports, applications, services, codes, textual strings, communication devices, users, policies and rules, defined network management criteria, traffic flows, signaling, algorithms (e.g., network management algorithms, network element configuration-DNS records alignment, alignment validation, and/or alignment reporting algorithms, metadata algorithms, tagging and/or mapping algorithms, and/or AI, machine learning, or neural network algorithms, as disclosed, defined, recited, or indicated herein by the methods, systems, and techniques described herein), protocols, interfaces, tools, and/or other information, to facilitate operation of the AMC 128, as more fully disclosed herein, and control data flow between the AMC 128 and other components (e.g., network devices, components, or equipment of or associated with the communication network 102, communication devices, or other components) and/or associated applications associated with the AMC 128.

With further regard to the data store 620, the data store 620 can store data structures (e.g., user data, metadata), code structure(s) (e.g., modules, objects, hashes, classes, procedures) or instructions, information relating to NFs or other network elements, configuration parameters (e.g., configuration parameters associated with network elements), other parameters associated with the communication network 102, variables, resource-related identifiers (e.g., FQDNs, URIs, or other resource-related identifiers), metadata (e.g., metadata associated with configuration parameters, resource-related identifiers, and/or DNS records), URLs, domains, sub-domains, DNS records, DNS name servers, mapping of metadata items to configuration parameters, resource-related identifiers, and/or DNS records, audit reports, delta audit reports, baseline audit reports, applications, services, codes, textual strings, communication devices, users, policies and rules, defined network management criteria, traffic flows, signaling, algorithms (e.g., network management algorithms, network element configuration-DNS records alignment, alignment validation, and/or alignment reporting algorithms, metadata algorithms, tagging and/or mapping algorithms, and/or AI, machine learning, or neural network algorithms, as disclosed, defined, recited, or indicated herein by the methods, systems, and techniques described herein), protocols, interfaces, tools, and/or other information, to facilitate controlling operations associated with the AMC 128. In an aspect, the processor component 618 can be functionally coupled (e.g., through a memory bus) to the data store 620 in order to store and retrieve information desired to operate and/or confer functionality, at least in part, to the AMC 128 and its components, and the data store 620, and/or substantially any other operational aspects of the AMC 128.

It should be appreciated that the data store 620 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In some embodiments, the AMC 128 can employ AI and/or ML techniques, functions, and/or algorithms to perform analysis on data relating to network elements (e.g., NFs or other network elements), configuration parameters, resource-related identifiers, metadata, DNS records, DNS name servers, audit reports, delta comparison audit reports, baseline comparison audit reports, domains associated with the communication network 102, sub-domains of domains, applications, services, users, historical information relating thereto, or other desired types of information, to facilitate aligning or validating alignment of (e.g., automatically aligning or validating alignment between) network element configuration and DNS records, determining whether a DNS record is missing, determining metadata (e.g., determining one or more types of metadata items) to associate with a configuration parameter(s) and/or resource-related identifier(s), determining whether to aggregate configuration parameters and/or resource-related identifiers and associate the aggregated configuration parameters and/or resource-related identifiers with a same metadata item, determining a mapping between metadata items and a configuration parameter(s), resource-related identifier(s), a DNS record(s), and/or a DNS name server(s), and/or other determinations.

In certain embodiments, in connection with or as part of such an AI or ML-based analysis, the AMC 128 can employ, build (e.g., construct or create), and/or import, AI and/or ML techniques, functions, and algorithms, AI and/or ML models, neural networks (e.g., neural networks trained using the AMC 128), and/or graph mining to render and/or generate predictions, inferences, calculations, prognostications, estimates, derivations, forecasts, detections, and/or computations that can facilitate aligning or validating alignment of (e.g., automatically aligning or validating alignment between) network element configuration and DNS records, determining whether a DNS record is missing, determining metadata (e.g., determining one or more types of metadata items) to associate with a configuration parameter(s) and/or resource-related identifier(s), determining whether to aggregate configuration parameters and/or resource-related identifiers and associate the aggregated configuration parameters and/or resource-related identifiers with a same metadata item, determining a mapping between metadata items and a configuration parameter(s), resource-related identifier(s), a DNS record(s), and/or a DNS name server(s), and/or making other desired determinations, such as the determinations described herein, and/or can facilitate automating one or more functions or features of the disclosed subject matter (e.g., automating one or more functions or features of or associated with the AMC 128, the communication network 102, a communication device, or other device or component), as more fully described herein.

The AMC 128 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AMC 128 can examine the entirety or a subset of the data (e.g., data associated with data sessions, communication devices, or users; or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the disclosed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In accordance with various embodiments, the disclosed subject matter, employing the AMC 128 and its constituent or associated components, and/or associated applications, can perform multiple (e.g., two or more) operations relating to data analysis, aligning or validating alignment of (e.g., automatically aligning or validating alignment between) network element configuration and DNS records, determining whether a DNS record is missing, determining metadata (e.g., determining one or more types of metadata items) to associate with a configuration parameter(s) and/or resource-related identifier(s), determining whether to aggregate configuration parameters and/or resource-related identifiers and associate the aggregated configuration parameters and/or resource-related identifiers with a same metadata item, determining a mapping between metadata items and a configuration parameter(s), resource-related identifier(s), a DNS record(s), and/or a DNS name server(s), in parallel, concurrently, and/or simultaneously, as desired.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
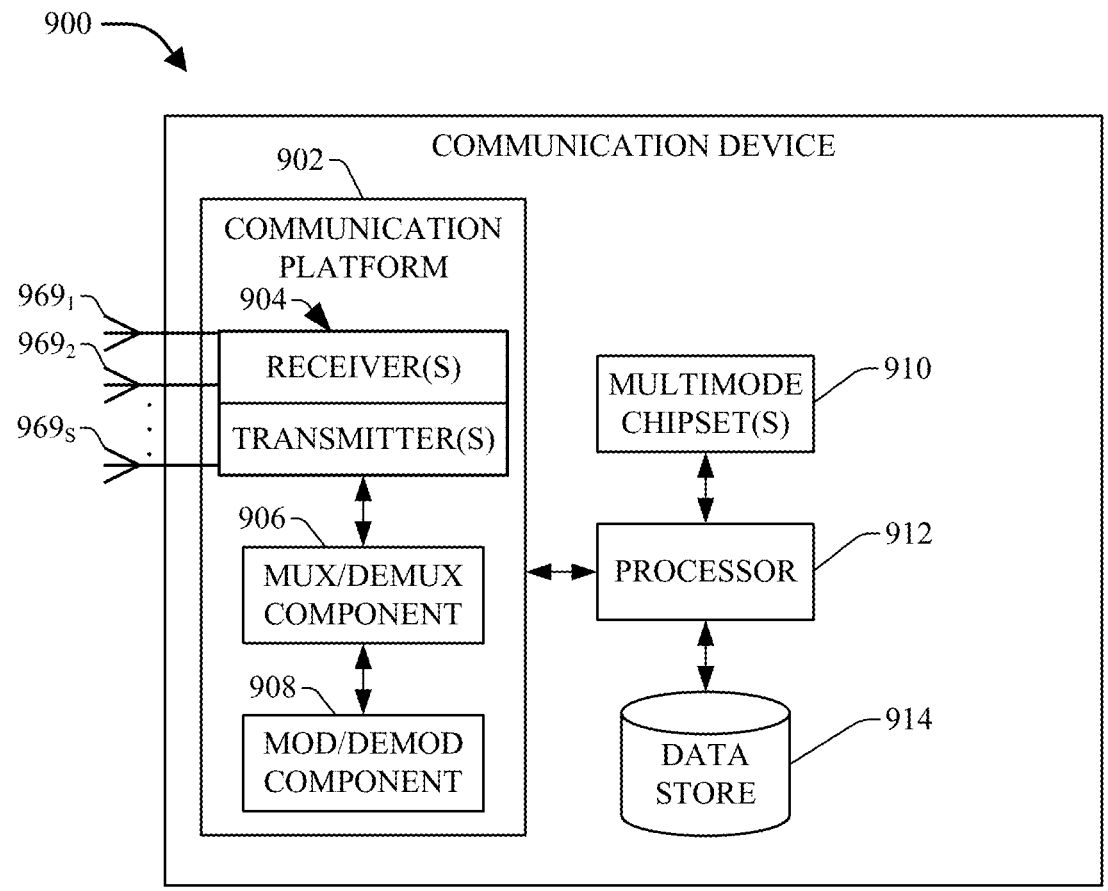
FIG. 9 depicts a block diagram of example communication device, in accordance with various aspects and embodiments of the disclosed subject matter.

FIG. 9 depicts a block diagram of an example communication device 900 (e.g., communication device) in accordance with various aspects and embodiments of the disclosed subject matter. In accordance with various embodiments, the communication device 900 (e.g., communication device) can be a multimode access terminal, wherein a set of antennas $969_1$-$969_S$ (wherein S can be a positive integer) can receive and transmit signal(s) from and to wireless devices like access points, access terminals, wireless ports and routers, and so forth, that operate in a radio access network. It should be appreciated that antennas $969_1$-$969_S$ can be a part of communication platform 902, which comprises electronic components and associated circuitry that provide for processing and manipulation of received signal(s) and signal(s) to be transmitted; e.g., receivers and transmitters 904, multiplexer/demultiplexer (mux/demux) component 906, and modulation/demodulation (mod/demod) component 908.

In some implementations, the communication device 900 can include a multimode operation chipset(s) 910 that can allow the communication device 900 to operate in multiple communication modes in accordance with disparate technical specification for wireless technologies. In an aspect, multimode operation chipset(s) 910 can utilize communication platform 902 in accordance with a specific mode of operation (e.g., voice, global positioning system (GPS), or other mode of operation). In another aspect, multimode operation chipset(s) 910 can be scheduled to operate concurrently (e.g., when S>1) in various modes or within a multitask paradigm.

The communication device 900 also can include a processor(s) 912 that can be configured to confer functionality, at least in part, to substantially any electronic component within the communication device 900, in accordance with aspects of the disclosed subject matter. For example, the processor(s) 912 can facilitate enabling the communication device 900 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 912 can facilitate enabling the communication device 900 to process data relating to messaging, voice calls, or other services (e.g., Internet services or access); information relating to measurements of signal conditions with respect to cells; information relating to cells to facilitate connection to a source cell or target cell; information relating to parameters (e.g., communication device parameters, network-related parameters); information relating to interactions between the communication device 900 and other devices or components (e.g., another communication device, network equipment, virtual assistant (VA)), as more fully described herein; and/or other data.

The communication device 900 also can contain a data store 914 that can store data structures (e.g., user data, metadata); code structure(s) (e.g., modules, objects, classes, procedures) or instructions; message hashes; neighbor cell list; one or more lists (e.g., whitelist, etc.); information relating to measurements of signal conditions with respect to cells; information relating to cells to facilitate connection to a source cell or target cell; information relating to parameters (e.g., communication device parameters, network-related parameters); information relating to interactions between the communication device 900 and other devices or components (e.g., another communication device, network equipment, or VA); communication device identifier; information relating to voice calls, messaging, or other services associated with the communication device 900; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 912 can be functionally coupled (e.g., through a memory bus) to the data store 914 in order to store and retrieve information (e.g., neighbor cell list; signal quality measurement-related information; cell-related information; parameter information; information relating to messaging, voice calls, or other services (e.g., interactive services); information relating to interactions; frequency offsets; desired algorithms; security code; communication device identifier; or other information) that can be desired to operate and/or confer functionality, at least in part, to communication platform 902, multimode operation chipset(s) 910, and/or substantially any other operational aspects of the communication device 900.

Figure 10:
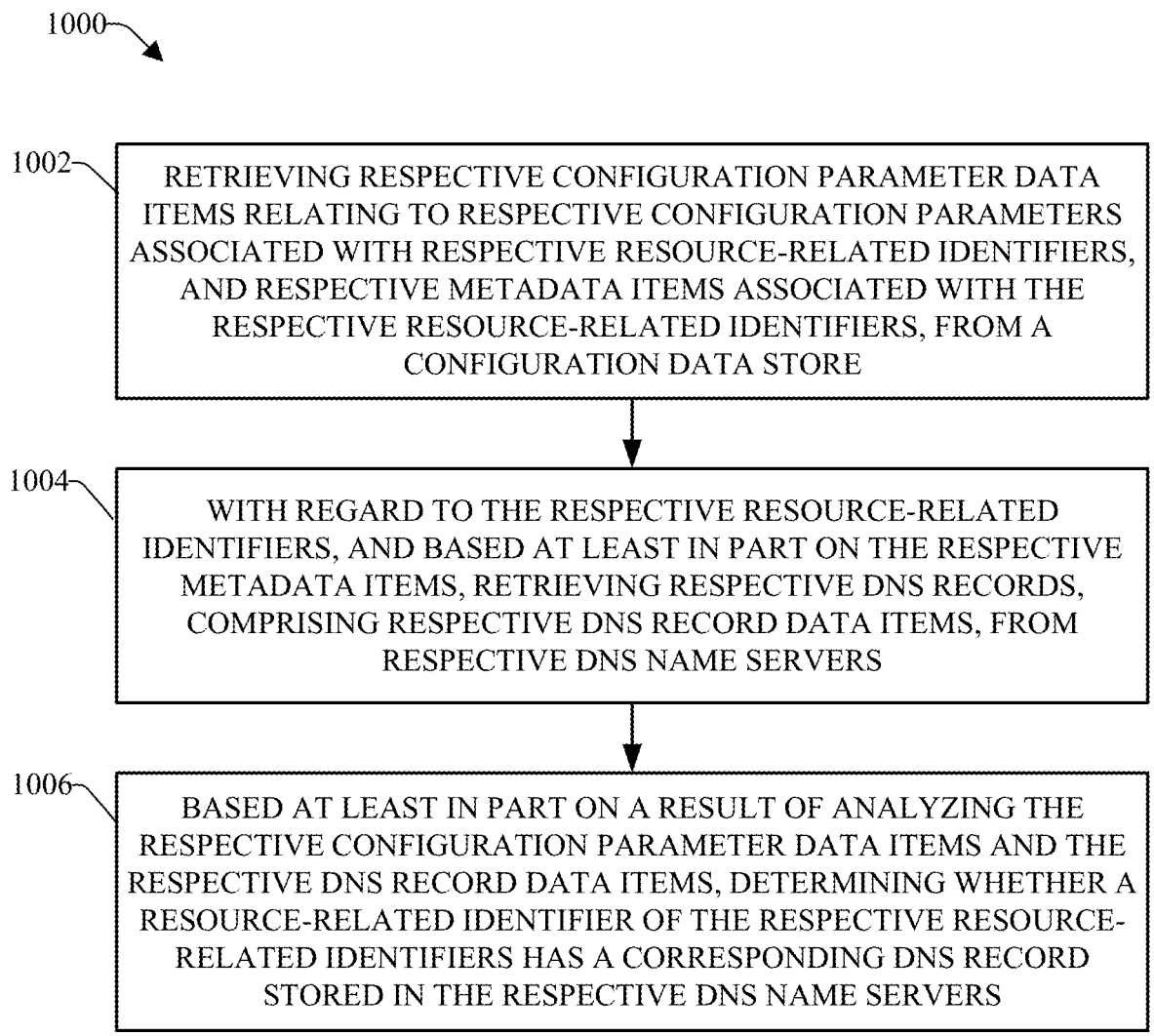
FIG. 10 illustrates a flow diagram of an example, non-limiting method that can desirably validate alignment between network element configuration parameters and DNS records associated with a communication network, in accordance with various aspects and embodiments of the disclosed subject matter.
Figure 11:
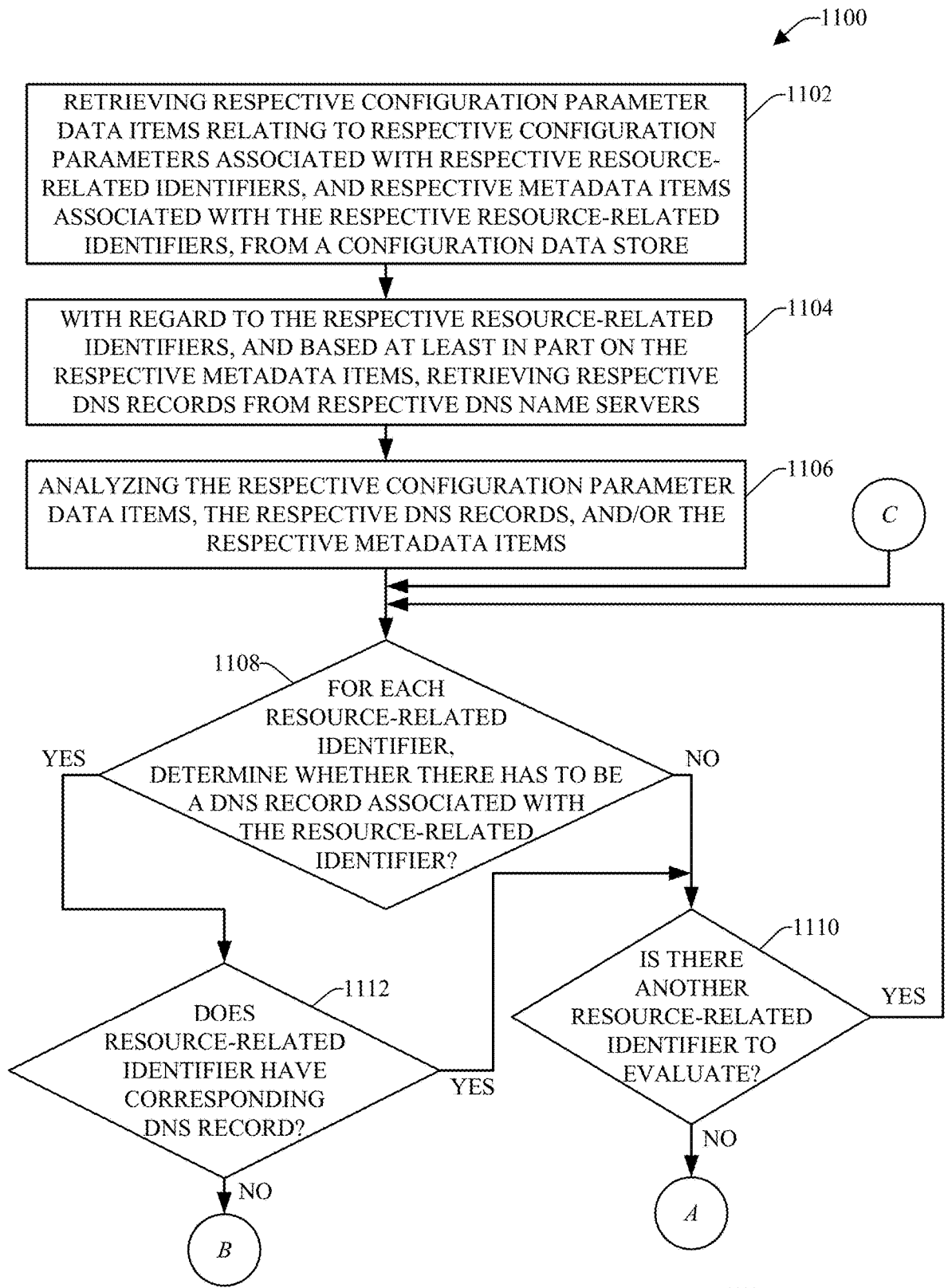
FIGS. 11 and 12 depict a flow diagram of an example, non-limiting method that can desirably validate alignment, and/or report misalignment, between network element configuration parameters and DNS records associated with a communication network, in accordance with various aspects and embodiments of the disclosed subject matter.
Figure 12:
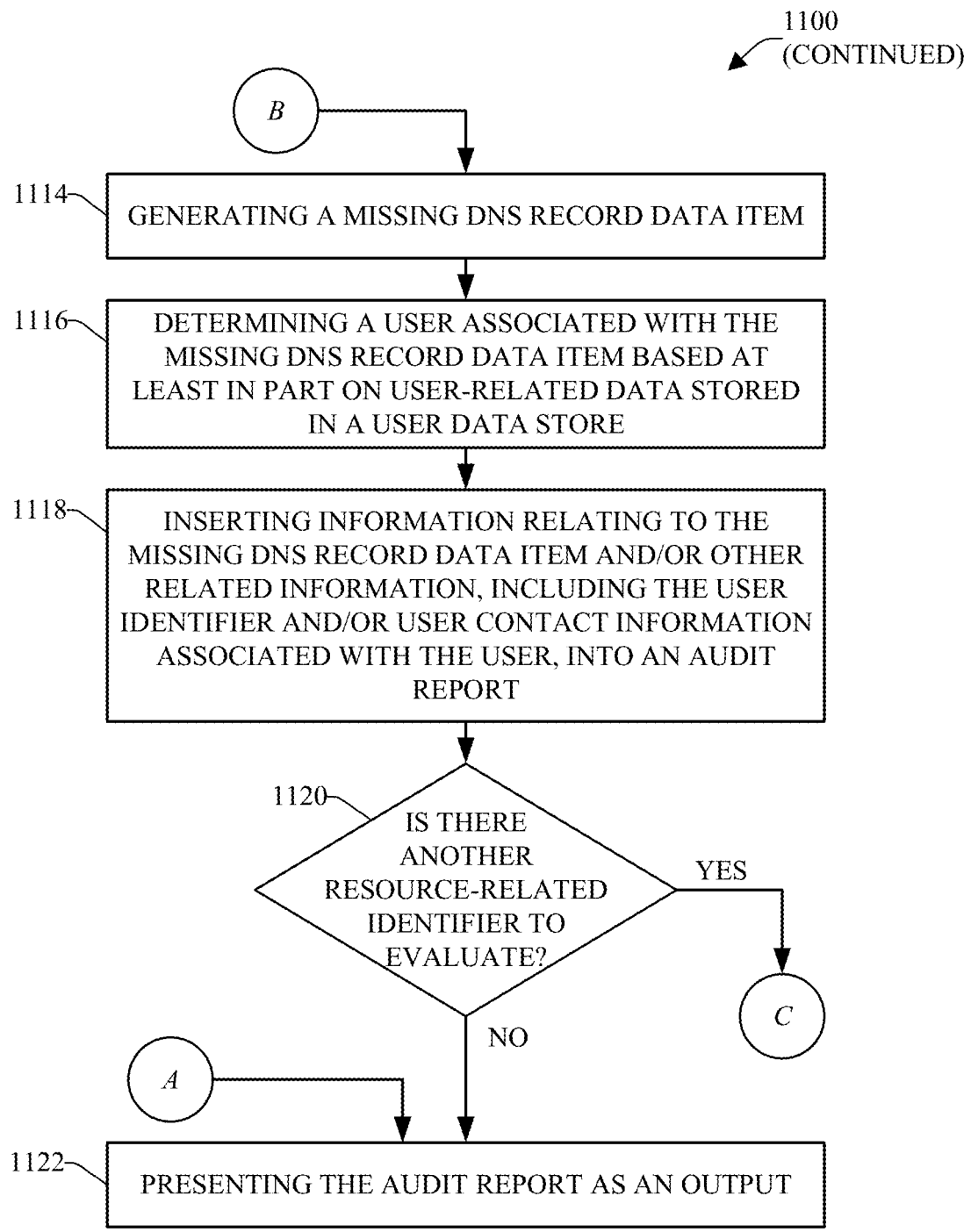

In view of the example systems and/or devices described herein, example methods that can be implemented in accordance with the disclosed subject matter can be further appreciated with reference to flowchart in FIGS. 10-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow diagram of an example, non-limiting method 1000 that can desirably (e.g., automatically, accurately, efficiently, and/or optimally) validate alignment between network element configuration parameters and DNS records associated with a communication network, in accordance with various aspects and embodiments of the disclosed subject matter. The method 1000 can be implemented by a system that can comprise an AMC, a processor component, a data store, and/or another component(s). Alternatively, or additionally, a machine-readable medium can comprise executable instructions that, when executed by a processor, facilitate performance of the operations of the method 1000.

At 1002, respective configuration parameter data items relating to respective configuration parameters associated with respective resource-related identifiers, and respective metadata items associated with the respective resource-related identifiers, can be retrieved from a configuration data store. The AMC can retrieve (e.g., extract, access, obtain, or receive) the respective configuration parameter data items relating to the respective configuration parameters associated with respective resource-related identifiers (e.g., FQDN, URI, or other type of resource-related identifier), and the respective metadata items associated with the respective resource-related identifiers, from the configuration data store (e.g., data store comprising the network element configuration GS database). In some embodiments, prior to operation 1002, the metadata component of the AMC can (e.g., optionally can) generate the respective metadata items and associate (e.g., link, map, or otherwise associate) the respective metadata items with the respective configuration parameters and/or the respective resource-related identifiers, and can store the respective metadata items in the configuration data store (and/or another desired data store), such as described herein.

At 1004, with regard to the respective resource-related identifiers, and based at least in part on the respective metadata items, respective DNS records, comprising respective DNS record data items, can be retrieved from respective DNS name servers. The AMC can retrieve the respective DNS records, comprising the respective DNS record data items, from the respective DNS name servers, based at least in part on the result of analyzing the respective metadata items, wherein the respective metadata items can be associated with (e.g., can correspond to) the respective DNS records. For instance, a metadata item can indicate whether a resource-related identifier is associated with (e.g., requires) a corresponding DNS record, can indicate a type of DNS record that can be associated with the resource-related identifier, or can indicate a DNS name server of the respective DNS name servers where the DNS record is specified, expected, or supposed to be stored.

At 1006, based at least in part on a result of analyzing the respective configuration parameter data items and the respective DNS record data items, a determination can be made regarding whether a resource-related identifier of the respective resource-related identifiers has a corresponding DNS record stored in the respective DNS name servers. For instance, the AMC can analyze the respective configuration parameter data items and the respective DNS record data items. Based at least in part on the result of analyzing the respective configuration parameter data items, the respective DNS record data items, and/or the respective metadata items, the AMC can determine whether a resource-related identifier of the respective resource-related identifiers has a corresponding DNS record stored in the respective DNS name servers.

With regard to each resource-related identifier for which a DNS record is supposed (e.g., required) to be associated, if the AMC determines that the corresponding DNS record is not detected as being stored in the respective DNS name servers (e.g., is not detected as being stored in the DNS name server indicated by the corresponding metadata item), the AMC can generate a missing DNS record data item that can indicate the corresponding DNS record is determined not to be stored in the respective DNS name servers. The AMC can generate an audit report comprising one or more missing respective DNS record data items with regard to one or more respective DNS records that the AMC has determined to be missing from the respective DNS name servers, such as described herein. The AMC can communicate the audit report, or a desired portion thereof, to one or more users (e.g., one or more network operators or other users) who can be responsible for resolving the issue of the one or more missing DNS records, such as described herein.

In some embodiments, if the AMC determines that a DNS record associated with a metadata item is stored in a DNS name server, the AMC can generate a verified DNS record data item that can indicate that the DNS record is determined to be stored in the DNS name server. In certain embodiments, the AMC can include the verified DNS record data item in the audit report. In other embodiments, if the AMC determines that a DNS record associated with a metadata item is stored in a DNS name server, the AMC can omit (e.g., bypass) generation of a verified DNS record data item and/or can omit inclusion of the verified DNS record data item in the audit report (e.g., the AMC can include missing respective DNS record data items in the audit report, while omitting verified DNS record data items from the audit report).

FIGS. 11 and 12 depict a flow diagram of an example, non-limiting method 1100 that can desirably (e.g., automatically, accurately, efficiently, and/or optimally) validate alignment, and/or report misalignment, between network element configuration parameters and DNS records associated with a communication network, in accordance with various aspects and embodiments of the disclosed subject matter. The method 1100 can be implemented by a system that can comprise an AMC, a processor component, a data store, and/or another component(s). Alternatively, or additionally, a machine-readable medium can comprise executable instructions that, when executed by a processor, facilitate performance of the operations of the method 1100.

At 1102, respective configuration parameter data items relating to respective configuration parameters associated with respective resource-related identifiers, and respective metadata items associated with the respective resource-related identifiers, can be retrieved from a configuration data store. The AMC can retrieve the respective configuration parameter data items relating to the respective configuration parameters associated with respective resource-related identifiers (e.g., FQDN, URI, or other type of resource-related identifier), and the respective metadata items associated with the respective resource-related identifiers, from the configuration data store. In certain embodiments, prior to operation 1102, the metadata component of the AMC can (e.g., optionally can) generate the respective metadata items and associate (e.g., link, map, or otherwise associate) the respective metadata items with the respective configuration parameters and/or the respective resource-related identifiers, and can store the respective metadata items in the configuration data store (and/or another desired data store), such as described herein.

At 1104, with regard to the respective resource-related identifiers, and based at least in part on the respective metadata items, respective DNS records can be retrieved from respective DNS name servers. The AMC can retrieve the respective DNS records from the respective DNS name servers, based at least in part on the result of analyzing the respective metadata items, wherein the respective DNS records can comprise respective DNS record data items, and wherein the respective metadata items can be associated with (e.g., can correspond to) the respective DNS records. For instance, a metadata item can indicate whether a resource-related identifier is associated with (e.g., requires) a corresponding DNS record, can indicate a type of DNS record that can be associated with the resource-related identifier, or can indicate a DNS name server of the respective DNS name servers where the DNS record is specified, expected, or supposed to be stored.

At 1106, the respective configuration parameter data items, the respective DNS records, and/or the respective metadata items can be analyzed. The AMC can analyze the respective configuration parameter data items, the respective DNS records, and/or the respective metadata items.

At 1108, with regard to each resource-related identifier, a determination can be made regarding whether there has to be a DNS record associated with the resource-related identifier, based at least in part on the analysis results. For instance, with regard to each resource-related identifier, the AMC can determine whether there has to be a DNS record associated with the resource-related identifier (e.g., determine whether the resource-related identifier requires a DNS record), based at least in part on the analysis results.

If it is determined that the resource-related identifier does not have to have a DNS record associated therewith, at 1110, a determination can be made regarding whether there is another resource-related identifier to evaluate. For instance, with regard to each resource-related identifier, in response to determining that the resource-related identifier does not have to have a DNS record associated therewith, the AMC can determine whether there is another resource-related identifier, of the respective resource-related identifiers, to evaluate.

If it is determined that there is another resource-related identifier, of the respective resource-related identifiers, to evaluate, at this point, the method 1100 can return to reference numeral 1108, and the method 1100 can perform the aforementioned operation described at reference numeral 1108 and can proceed from that point. If, instead, at reference numeral 1110, it is determined that there is no other resource-related identifier, of the respective resource-related identifiers, to evaluate, the method 1100 can proceed to reference point A, wherein, as depicted in FIG. 12, the method 1100 can proceed from reference point A to reference numeral 1122, and the method 1100 can perform the operation at reference numeral 1122, as described herein.

Referring again to reference numeral 1108, if, instead, it is determined that the resource-related identifier is to have a DNS record associated therewith, at 1112, a determination can be made regarding whether a resource-related identifier of the respective resource-related identifiers has a corresponding DNS record stored in the respective DNS name servers, based at least in part on the analysis results. For instance, at least in part on the result of analyzing the respective configuration parameter data items, the respective DNS record data items, and/or the respective metadata items, with regard to each resource-related identifier, the AMC can determine whether the resource-related identifier has a corresponding DNS record stored in the respective DNS name servers (e.g., stored in a DNS name server, if and/or as indicated by the associated metadata item).

If it is determined that the resource-related identifier has the corresponding DNS record stored in the DNS name server, the method 1100 can return to reference numeral 1110, wherein a determination can be made regarding whether there is another resource-related identifier to evaluate, and the method 1100 can proceed from that point, such as described herein. For instance, with regard to each resource-related identifier (for which a DNS record is to be associated), if the AMC determines that the resource-related identifier has the corresponding DNS record stored in the DNS name server, the AMC can determine that the DNS record associated with the resource-related identifier has been verified. In some embodiments, the AMC can generate a verified DNS record data item that can indicate the DNS record associated with the resource-related identifier has been verified as being stored in the DNS name server, such as described herein. The AMC also can proceed to determine whether there is another resource-related identifier to evaluate, as described herein.

Referring again to reference numeral 1112, if, instead, at 1112, it is determined that the resource-related identifier does not have the corresponding DNS record stored in the DNS name servers, the method 1100 can proceed to reference point B, wherein, as depicted in FIG. 12, the method 1100 can proceed from reference point B to reference numeral 1114, and the method 1100 can proceed from that point, as described herein.

At 1114, a missing DNS record data item can be generated. With regard to each resource-related identifier (for which a DNS record is to be associated), if the AMC determines that the resource-related identifier does not have the corresponding DNS record stored in the DNS name servers, the AMC can generate the missing DNS record data item to indicate that the DNS record, associated with the resource-related identifier, that is supposed (e.g., specified or expected) to be stored in the DNS name server (e.g., the designated or indicated DNS name server) is missing from the DNS name server (e.g., is not detected as being stored in the DNS name server).

At 1116, a user associated with the missing DNS record data item can be determined based at least in part on user-related data stored in a user data store. In some embodiments, in response to determining that a DNS record is missing, the AMC can access or search (e.g., query) the user-related data stored in the user data store, based at least in part on information (e.g., the resource-related identifier, the NF associated with the resource-related identifier, the associated metadata item, DNS record-related data, information regarding the DNS name server, or other information) of or associated with the resource-related identifier and/or the missing DNS record. For instance, in the user-related data stored in the user data store, a user identifier (e.g., name of a user, employment role or department associated with the user, and/or other user identifier), associated user contact information, and/or other desired user-related information can be associated with the information of or associated with the resource-related identifier and/or the missing DNS record. Based at least in part on the accessing or searching of the user data store (e.g., using the information of or associated with the resource-related identifier and/or the missing DNS record), the AMC can determine a user associated with the missing DNS record associated with the resource-related identifier. The user can be, for example, a network operator, a network supervisor or manager, or other desired user (e.g., other network person, or other user employed outside of the communication network) who can be responsible for resolving or correcting the issue of the missing DNS record (and/or other similar missing DNS records). The user contact information can comprise, indicate, or specify a phone number and/or message account (e.g., email account, text message account, or other type of message account) associated with the user, wherein the AMC can utilize the user contact information to contact the user to notify the user of the missing DNS record and/or request that the user resolve or correct the issue of the missing DNS record.

At 1118, information relating to the missing DNS record data item and/or other related information, including the user identifier and/or user contact information associated with the user, can be inserted into an audit report. The AMC can generate (e.g., create) an audit report that can comprise information relating to missing DNS record data items and/or other desired information. With regard to each resource-related identifier (e.g., for which a DNS record has been determined to be missing), the AMC can insert the information relating to the missing DNS record data item and/or other related information, including the user identifier and/or user contact information associated with the user, in the audit report. In some embodiments, if and as desired, with regard to verified DNS records, associated with certain resource-related identifiers, that were identified or located in the DNS name servers, the AMC also can include other information relating to the verified DNS records in the audit report.

It is to be appreciated and understood that, in certain embodiments, the user information regarding a user associated with a missing DNS record data item can be applied at or near the end of the audit process directly onto the audit report. For instance, the audit report can be divided (e.g., partitioned or split) into multiple audit reports on a per NF basis, per network element group (e.g., group of network elements or NFs) basis, per user basis, per user group (e.g., user organization or department) basis, or per another desired basis with respect to the user or group of users who is determined to be responsible for the network element or group of network elements associated with the missing DNS records. The AMC can associate or apply the respective user information with or to the respective multiple audit reports, comprising the respective portions (e.g., respective relevant portions) of the information relating the missing DNS records, and/or can determine or generate the respective multiple audit reports based at least in part on the respective basis and/or the respective users, in accordance with the applied basis (e.g., NF basis, network element basis, user basis, user group basis, or other desired basis). Accordingly, in such certain embodiments or other embodiments, operations of the method 1100, including operations 1116 and/or 1118, can be modified and/or can be performed (e.g., as described, or as modified) at a different point (e.g., later point) of the method 1100, in accordance with the various aspects and embodiments of the disclosed subject matter.

At 1120, a determination can be made regarding whether there is another resource-related identifier to evaluate. For instance, in response to inserting the information relating to the missing DNS record data item and/or other related information, including the user identifier and/or user contact information associated with the user, into the audit report, the AMC can determine whether there is another resource-related identifier, of the respective resource-related identifiers, to evaluate.

If it is determined that there is another resource-related identifier, of the respective resource-related identifiers, to evaluate, at this point, the method 1100 can proceed to reference point C, wherein, as depicted in FIG. 11, the method 1100 can proceed from reference point C to return to reference numeral 1108, and wherein the method 1100 can perform the aforementioned operation described at reference numeral 1108 and can proceed from that point. If, instead, at reference numeral 1120, it is determined that there is no other resource-related identifier, of the respective resource-related identifiers, to evaluate, the method 1100 can proceed to reference numeral 1122, and the method 1100 can perform the operation at reference numeral 1122, as described herein.

At 1122, the audit report can be presented as an output. The AMC can present (e.g., communicate or display) the audit report, or a desired portion thereof, to one or more users via one or more interfaces, one or more communication devices, and/or one or more message accounts associated with the one or more users. In accordance with various embodiments, the AMC can present respective portions of the audit report (e.g., an individual missing DNS record data item or group of missing DNS record data items) in a serial or dynamic manner to respective users as the missing DNS record data items or groups of missing DNS record data items are identified by the AMC or can present the audit report after the AMC determines that there is no remaining resource-related identifier to evaluate at that time (e.g., if and when that is determined at reference numeral 1110 of the method 1100), to facilitate notifying the respective users of the missing DNS record data items.

Figure 13:
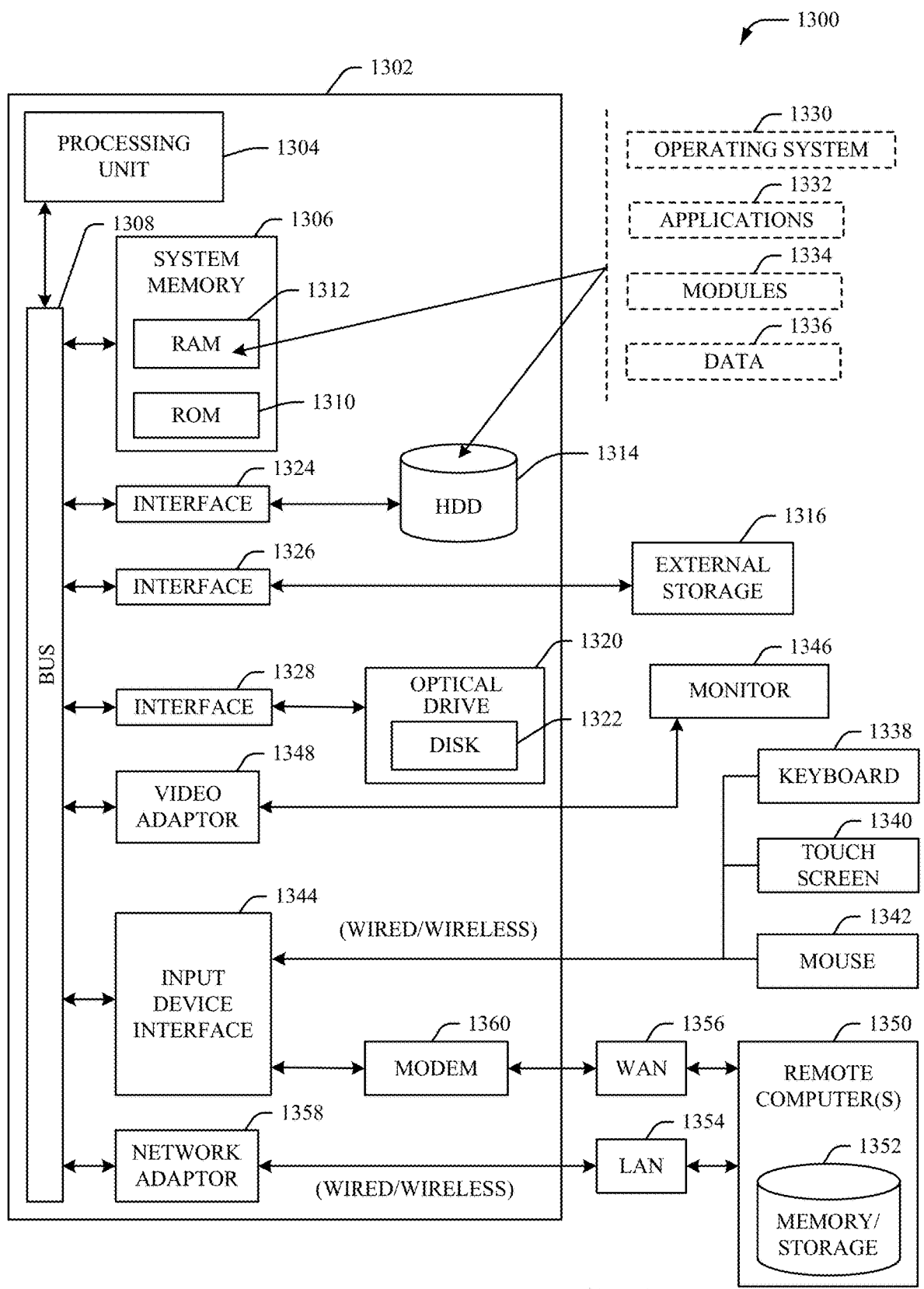
FIG. 13 illustrates an example block diagram of an example computing environment in which the various embodiments of the embodiments described herein can be implemented.

In order to provide additional context for various embodiments described herein, FIG. 13 and the following discussion are intended to provide a brief, general description of a suitable computing environment 1300 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, stand-alone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356, e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "entity," and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise analyzing data, aligning or validating alignment between network element configuration and DNS records, determining whether a DNS record is missing or verified, determining metadata (e.g., determining one or more types of metadata items) to associate with a configuration parameter(s) and/or resource-related identifier(s), determining whether to aggregate configuration parameters and/or resource-related identifiers and associate the aggregated configuration parameters and/or resource-related identifiers with a same metadata item, determining a mapping between metadata items and a configuration parameter(s), resource-related identifier(s), a DNS record(s), and/or a DNS name server(s), or other actions. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, the AMC, communication devices, processors, data stores, AI component (e.g., AI or ML that can be performed by the AMC), sensors, antennae, audio and/or visual output devices, or other devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    generating, by a system comprising a processor, a first missing record data item that indicates a first record is not stored in a first server;
    generating, by the system, a report that comprises respective missing record data items that indicate respective corresponding records are determined not to be stored in respective servers, wherein the respective missing record data items comprise the first missing record data item, wherein the respective corresponding records comprise the first record, and wherein the respective servers comprise the first server;
    grouping, by the system, the respective missing record data items associated with respective configuration parameters into respective subgroups of missing record data items based on respective network functions associated with the respective missing record data items; and
    classifying, by the system, the respective missing record data items with respective record classifications that indicate respective types of records associated with the respective missing record data items,
    wherein the report comprises subgroup information relating to the respective subgroups and record classification information relating to the respective record classifications, wherein, in the report, information relating a configuration parameter of the respective configuration parameters is searchable or extractable, and wherein the information relating to the configuration parameter comprises a portion of the respective missing record data items, respective configuration parameter data items related to the respective configuration parameters, respective record data items, the subgroup information, or the record classification information.

2. The method of claim 1, wherein the report comprises a user identifier, and wherein the user identifier identifies a user associated with the first missing record data item.

3. The method of claim 1, further comprising:
    presenting, by the system, the report to a device or a message account associated with a user identity.

4. The method of claim 3, further comprising:
    determining, by the system, the user identity, the device, or the message account based on a result of analyzing user identity data, device identifier data, message account identifier data, and network element data.

5. The method of claim 4, wherein the network element data indicates a network element associated with a corresponding domain-name-system record, and wherein the user identity data indicates the user identity associated with the network element.

6. The method of claim 1, wherein the record classifications relate to a service record, a name authority pointer record, or an address record.

7. The method of claim 1, wherein the report comprises report data, and wherein the method further comprises:
    comparing, by the system, the report data to previous report data of a previous report;
    determining, by the system, a difference between the report data and the previous report data; and
    sending, by the system, difference information relating to the difference.

8. The method of claim 1, wherein the report comprises report data, and wherein the method further comprises:
comparing, by the system, the report data of the report to baseline report data of a baseline report, wherein the baseline report data indicates a defined baseline relating to missing record data items;
determining, by the system, a difference between the report data and the baseline report data; and
sending, by the system, difference information relating to the difference to a device or a message account.

9. The method of claim 1, further comprising:
in response to determining that a corresponding domain-name-system record is stored in a domain-name-system name server, generating, by the system, a verified record data item;
including, by the system, the verified record data item in the report; and
sending, by the system, the report to a device or a message account associated with a user identity for presentation via the device or the message account.

10. The method of claim 1, further comprising:
inserting, by the system and into the report, user contact information of a user associated with the first missing record data item.

11. The method of claim 10, further comprising:
determining, by the system, that the user is responsible for the first missing record data item,
wherein the inserting of the user contact information is based on the determining that the user is responsible for the first missing record data item.

12. A system, comprising:
a processor; and
a memory that stores executable instructions that, when executed by the processor, facilitate performance of operations, comprising:
generating a first missing record data item that indicates a first record is not stored in a first server;
generating a report that comprises respective missing record data items that indicate respective corresponding records are determined not to be stored in respective servers, wherein the respective missing record data items comprise the first missing record data item, wherein the respective corresponding records comprise the first record, and wherein the respective servers comprise the first server;
grouping the respective missing record data items associated with respective configuration parameters into respective subgroups of missing record data items based on respective functions associated with the respective missing record data items; and
classifying, by the system, the respective missing record data items with respective record classifications that indicate respective types of records associated with the respective missing record data items,
wherein the report comprises subgroup information relating to the respective subgroups and record classification information relating to the respective record classifications, wherein, in the report, information relating a configuration parameter of the respective configuration parameters is searchable or extractable, and wherein the information relating to the configuration parameter comprises a portion of the respective missing record data items, respective configuration parameter data items related to the respective configuration parameters, respective record data items, the subgroup information, or the record classification information.

13. The system of claim 12, wherein the report comprises a user identifier, and wherein the user identifier identifies a user associated with the first missing record data item.

14. The system of claim 12, wherein the operations further comprise:
determining a user identity, a device, or a message account associated with the first missing record data item based on a result of analyzing user identity information, device identifier information, message account identifier information, or network element information accessed from a data store.

15. The system of claim 14, wherein the network element information indicates a network element associated with a corresponding domain-name-system record, and wherein the user identity information indicates the user identity associated with the network element.

16. The system of claim 12, wherein the operations further comprise:
in response to determining that a corresponding domain-name-system record is stored in a domain-name-system name server, creating a verified record information item that indicates the corresponding domain-name-system record is determined to be stored in the domain-name-system name server; and
including the verified record information item in the report.

17. A non-transitory machine-readable medium, comprising executable instructions that, when executed by a processor, facilitate performance of operations, comprising:
generating a first missing record data item that indicates a first record is not stored in a first server;
generating a report that comprises respective missing record data items that indicate respective corresponding records are determined not to be stored in respective servers, wherein the respective missing record data items comprise the first missing record data item, wherein the respective corresponding records comprise the first record, and wherein the respective servers comprise the first server;
grouping the respective missing record data items associated with respective configuration parameters into respective subgroups of missing record data items; and
classifying the respective missing record data items with respective record classifications that indicate respective types of records associated with the respective missing record data items,
wherein the report comprises subgroup information relating to the respective subgroups and record classification information relating to the respective record classifications, wherein, in the report, information relating a configuration parameter of the respective configuration parameters is searchable or extractable, and wherein the information relating to the configuration parameter comprises a portion of the respective missing record data items, respective configuration parameter data items related to the respective configuration parameters, respective record data items, the subgroup information, or the record classification information.

18. The non-transitory machine-readable medium of claim 17, wherein the operations further comprise:
communicating the report to an interface, a device, or a message account associated with a user identity for presentation via the interface, the device, or the message account.

19. The non-transitory machine-readable medium of claim 17, wherein the report comprises a user identifier.

20. The non-transitory machine-readable medium of claim 19, wherein the user identifier identifies a user associated with the first missing record data item.

\* \* \* \* \*